(12) United States Patent
Geng et al.

(10) Patent No.: US 11,789,238 B2
(45) Date of Patent: Oct. 17, 2023

(54) ELECTRONIC IMAGING APPARATUS INCLUDING SEVEN LENSES OF +−+++−−, +−−+−+−, +−+−++−, +−++++−, −++−+− −, +++−++−, −++−++− OR +++−+−− REFRACTIVE POWERS

(71) Applicant: Zhejiang Sunny Optical Co., Ltd., Ningbo (CN)

(72) Inventors: Xiaoting Geng, Ningbo (CN); Jia Lu, Ningbo (CN); Lin Huang, Ningbo (CN); Fujian Dai, Ningbo (CN); Liefeng Zhao, Ningbo (CN)

(73) Assignee: Zhejiang Sunny Optical Co, , Ltd

( * ) Notice: Subject to any disclaimer, the term of this patent is extended or adjusted under 35 U.S.C. 154(b) by 342 days.

(21) Appl. No.: 16/854,401

(22) Filed: Apr. 21, 2020

(65) Prior Publication Data
US 2020/0371314 A1    Nov. 26, 2020

(30) Foreign Application Priority Data
May 20, 2019    (CN) .......................... 201910417037.7

(51) Int. Cl.
*G02B 13/00* (2006.01)
*G02B 9/64* (2006.01)
*G02B 13/06* (2006.01)

(52) U.S. Cl.
CPC .......... *G02B 13/0045* (2013.01); *G02B 9/64* (2013.01); *G02B 13/06* (2013.01)

(58) Field of Classification Search
CPC ....... G02B 13/0045; G02B 9/64; G02B 13/06
See application file for complete search history.

(56) References Cited

U.S. PATENT DOCUMENTS

| 8,767,315 B2 | 7/2014 | Tsai et al. |
| 2018/0106984 A1 | 4/2018 | Tang et al. |

(Continued)

FOREIGN PATENT DOCUMENTS

CN    109143535 A    1/2019

OTHER PUBLICATIONS

First Examination Report for Application No. 202044019473, dated Nov. 5, 2021, 5 pages.

*Primary Examiner* — Wen Huang
(74) *Attorney, Agent, or Firm* — Barnes & Thornburg LLP

(57) ABSTRACT

Provided is an electronic imaging apparatus including a first and a second image-picking apparatus located on the same side of the electronic imaging apparatus. The first image-picking apparatus includes a first lens system which sequentially includes a first to a seventh lens along its optical axis, the first lens thereof has a positive refractive power, the second lens thereof has a negative refractive power. The second image-picking apparatus includes a second lens system which sequentially includes a first to a seventh lens along its optical axis, where the object-side surface of the first lens is concave and the image-side surface of the first lens is convex, the third lens has a positive refractive power, the fourth lens has negative refractive power, and the fifth lens has a positive refractive power. Half of a maximal field-of-view Semi-FOV$_T$ of the first and second lens system Semi-FOV$_T$ and Semi-FOV$_W$ satisfy 35°<Semi-FOV$_T$<55° and 35°<Semi-FOV$_W$<55°.

17 Claims, 21 Drawing Sheets

(56) References Cited

U.S. PATENT DOCUMENTS

| | | | | |
|---|---|---|---|---|
| 2019/0025551 A1* | 1/2019 | Kuo | ........................ | G02B 13/06 |
| 2020/0073085 A1* | 3/2020 | Huang | ..................... | G02B 9/64 |
| 2021/0088755 A1* | 3/2021 | Nitta | ...................... | G02B 13/18 |
| 2022/0413264 A1* | 12/2022 | Kim | ................... | G02B 13/0045 |

* cited by examiner

ELECTRONIC IMAGING APPARATUS INCLUDING SEVEN LENSES OF +−+++−−, +−−+−+−, +−+−++−, +−++++−, −++−+− −, +++−++−, −++−++− OR +++−+−− REFRACTIVE POWERS

CROSS-REFERENCE TO RELATED APPLICATIONS

This application claims the priority from Chinese Patent Application No. 201910417037.7, filed in the National Intellectual Property Administration (CNIPA) on May 20, 2019, the disclosure of which is hereby incorporated by reference in its entirety.

TECHNICAL FIELD

The present disclosure relates to an electronic imaging apparatus, and more specifically to an electronic imaging apparatus including two image-picking apparatus.

BACKGROUND

It is well known that the primary function of a telephoto lens assembly is to be able to clearly capture a remote scene into the lens assembly, with a small viewing angle and a large image formed on the photographic plate. A wide-angle lens assembly has a large viewing angle and a wide field-of-view, and can present a wider clear range. However, at present, an imaging apparatus having a single function with a single lens assembly cannot meet the market demands for imaging quality and other imaging functions.

Therefore, there is a demand to achieve a zoom telephoto function while satisfying high imaging quality, to improve the practicality of an electronic imaging apparatus.

SUMMARY

To solve at least one of the problems in the existing technology, the present disclosure provides an electronic imaging apparatus, for example, an electronic imaging apparatus that enables a dual camera to perform high-quality optical zooming.

An aspect of the present disclosure provides an electronic imaging apparatus, including a first image-picking apparatus and a second image-picking apparatus, where the first image-picking apparatus includes a first lens system and a first electronic photosensitive element located on an image plane of the first lens system, the second image-picking apparatus includes a second lens system and a second electronic photosensitive element located on an image plane of the second lens system, and the second image-picking apparatus and the first image-picking apparatus are located on a same side of the electronic imaging apparatus. The first lens system sequentially includes, along an optical axis of the first lens system from an object side to an image side: a first lens having a refractive power, a second lens, a third lens, a fourth lens, a fifth lens, a sixth lens, and a seventh lens, wherein the first lens of the first lens system has a positive refractive power and the second lens of the first lens system has a negative refractive power; the second lens system sequentially comprises, along an optical axis of the second lens system from an object side to an image side: a first lens having a refractive power, a second lens, a third lens, a fourth lens, a fifth lens, a sixth lens, and a seventh lens, wherein an object-side surface of the first lens of the second lens system is concave and an image-side surface of the first lens of the second lens system is convex, the third lens of the second lens system has a positive refractive power, the fourth lens of the second lens system has a negative refractive power, and the fifth lens of the second lens system has a positive refractive power.

In an exemplary implementation, half of a maximal field-of-view Semi-$FOV_T$ of the first lens system satisfies: 35°<Semi-$FOV_T$<55°; and half of a maximal field-of-view Semi-$FOV_W$ of the second lens system satisfies: 35°<Semi-$FOV_W$<55°.

In an exemplary implementation, a total effective focal length $f_T$ of the first lens system satisfies: 4.7 mm<$f_T$<5.7 mm; and a total effective focal length $f_W$ of the second lens system satisfies: 4.7 mm<$f_W$<5.7 mm.

In an exemplary implementation, a distance $TTL_T$ on the optical axis of the first lens system from an object-side surface of the first lens of the first lens system to the image plane of the first lens system, and half of a diagonal length $ImgH_T$ of an effective pixel area on the image plane of the first lens system satisfy: $TTL_T/ImgH_T$<1.4; and a distance $TTL_W$ on the optical axis of the second lens system from the object-side surface of the first lens of the second lens system to the image plane of the second lens system, and half of a diagonal length $ImgH_W$ of an effective pixel area on the image plane of the second lens system satisfy: $TTL_W/ImgH_W$<1.4.

In an exemplary implementation, the total effective focal length $f_T$ of the first lens system and an effective focal length $f7_T$ of the seventh lens of the first lens system satisfy: −1.4<$f7_T/f_T$<−0.7; and the total effective focal length $f_W$ of the second lens system and an effective focal length $f7_W$ of the seventh lens of the second lens system satisfy: −1.4<$f7_W/f_W$<−0.7.

In an exemplary implementation, the distance $TTL_T$ on the optical axis of the first lens system from an object-side surface of the first lens of the first lens system to the image plane of the first lens system, the center thickness $CT1_T$ of the first lens of the first lens system on the optical axis of the first lens system, and the center thickness $CT2_T$ of the second lens of the first lens system on the optical axis of the first lens system satisfy: 0.4<$(CT1_T+CT2_T)/TTL_T×5$<1.0; and the distance $TTL_W$ on the optical axis of the second lens system from an object-side surface of the first lens of the first lens system to the image plane of the second lens system, the center thickness $CT1_W$ of the first lens of the second lens system on the optical axis of the second lens system, and the center thickness $CT2_W$ of the second lens of the second lens system on the optical axis of the second lens system satisfy: 0.4<$(CT1_W+CT2_W)/TTL_W×5$<1.0.

In an exemplary implementation, an effective focal length $f1_T$ of the first lens of the first lens system and an effective focal length $f2_T$ of the second lens of the first lens system satisfy: −0.6<$f1_T/f2_T$<−0.2.

In an exemplary implementation, a radius of curvature $R2_T$ of an image-side surface of the first lens of the first lens system, a radius of curvature $R1_T$ of an object-side surface of the first lens of the first lens system, a radius of curvature $R3_T$ of an object-side surface of the second lens of the first lens system, and a radius of curvature $R4_T$ of an image-side surface of the first lens of the first lens system satisfy: 0.7<$(R2_T−R1_T)/(R3_T−R4_T)$<1.3.

In an exemplary implementation, the radius of curvature $R11_T$ of an object-side surface of the sixth lens of the first lens system, a radius of curvature $R12_T$ of an image-side surface of the sixth lens of the first lens system, a radius of curvature $R9_T$ of an object-side surface of the fifth lens of the first lens system, and a radius of curvature $R10_T$ of an image-side surface of the fifth lens of the first lens system satisfy: $0.5<(R11_T+R12_T)/(R9_T+R10_T)<0.9$.

In an exemplary implementation, a total effective focal length $f_T$ of the first lens system and an entrance pupil diameter $EPD_T$ of the first lens system satisfy: $f_T/EPD_T \leq 2.10$.

In an exemplary implementation, the effective focal length $f5_W$ of the fifth lens of the second lens system, an effective focal length $f2_W$ of the second lens of the second lens system, and an effective focal length $f3_W$ of the third lens of the second lens system satisfy: $0.1<f5_W/(f2_W+f3_W)<0.5$.

In an exemplary implementation, a radius of curvature $R7_W$ of an object-side surface of the fourth lens of the second lens system, a radius of curvature $R8_W$ of an image-side surface of the fourth lens of the second lens system, and an effective focal length $f4_W$ of the fourth lens of the second lens system satisfy: $0.4<(R7_W+R8_W)/f4_W<0.9$.

In an exemplary implementation, a radius of curvature $R3_W$ of an object-side surface of the second lens of the second lens system, a radius of curvature $R4_W$ of an image-side surface of the second lens of the second lens system, a radius of curvature $R11_W$ of an object-side surface of the sixth lens of the second lens system, and a radius of curvature $R12_W$ of an image-side surface of the sixth lens of the second lens system satisfy: $0.8<(R3_W+R4_W)/(R11_W+R12_W)<1.3$.

In an exemplary implementation, the seventh lens of the first lens system has a negative refractive power, an object-side surface thereof is a concave surface and an image-side surface thereof is a concave surface.

In an exemplary implementation, an image-side surface of the third lens of the second lens system is a convex surface; and the seventh lens of the second lens system has a negative refractive power, an image-side surface thereof is a concave surface.

In an exemplary implementation, in the first lens system, there is an air spacing between any two adjacent lenses on an optical axis of the first lens system; and in the second lens system, there is an air spacing between any two adjacent lenses on the optical axis of the second lens system.

In an exemplary implementation, at least five lenses in the first to the seventh lens of the first lens system are plastic lenses; and at least five lenses in the first to the seventh lens of the second lens system are plastic lenses.

In an exemplary implementation, the first image-picking apparatus and the second image-picking apparatus are arranged longitudinally or laterally on one side of the electronic imaging apparatus.

In the present disclosure, two different image-picking apparatus are provided in the electronic imaging apparatus, and the refractive power, the surface shape, the center thickness of each lens, the on-axis spacing between each lens, and the like, of each lens in the two image-picking apparatus are rationally distributed, so that the electronic imaging apparatus has at least the following advantages: the imaging effect of mixed optical zooming can be achieved by alternating between different image-picking modes, while ensuring miniaturization and high-quality imaging of the electronic imaging apparatus.

BRIEF DESCRIPTION OF THE DRAWINGS

By describing non-limiting embodiments below in detail with reference to the accompanying drawings, other features, objectives and advantages of the present disclosure will be more apparent. In the accompanying drawings.

DETAILED DESCRIPTION OF EMBODIMENTS

Figure 1:
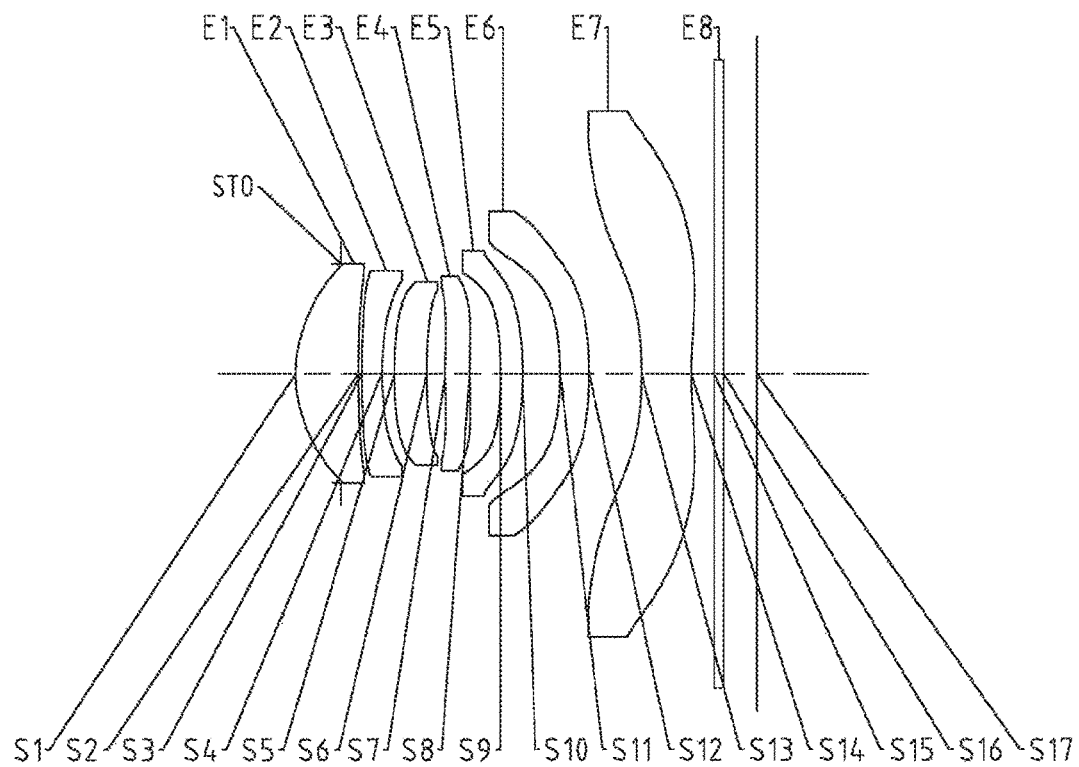
FIG. 1 is a schematic structural diagram illustrating a first lens system according to Embodiment 1.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements.

It should be understood that the terms "first", "second", "third", etc., are used herein to distinguish a feature from another feature, and do not denote any limitation on the feature. Thus, without departing from the teachings of present disclosure, the first lens discussed below may also be referred to as a second lens or a third lens, and the first image-picking apparatus may also be referred to as a second image-picking apparatus.

In the drawings, the thickness, size and shape of the lenses have been slightly exaggerated for ease of illustration. In particular, the shape of the spherical or aspherical surface shown in the drawings is shown by way of example. That is, the shape of the spherical or aspherical surface is not limited to the shape of the spherical or aspherical surface shown in the drawings. The drawings are for example only and not strictly proportional.

As used herein, a paraxial region refers to a region near the optical axis. If a surface of a lens is a convex surface and the position of the convex surface is not defined, it indicates that the surface of the lens is a convex surface at least in the paraxial region; if a surface of a lens is a concave surface and the position of the concave surface is not defined, it indicates that the surface of the lens is a concave surface at least in the paraxial region. The surface of each lens closest to the object is referred to as an object-side surface, and the surface of each lens closest to the image plane is referred to as an image-side surface.

It should be further understood that the terms "comprising," "including," "having," and variants thereof, when used in this specification, specify the presence of stated features, entireties, steps, operations, elements and/or components, but do not exclude the presence or addition of one or more other features, entireties, steps, operations, elements, components and/or combinations thereof. As used herein, the term "and/or" includes any and all combinations of one or more of the associated listed items. Expressions, such as "at least one of . . . ," when preceding a list of elements, modify the entire list of elements rather than the individual element in the list. Further, the use of "may," when describing the embodiments of the present disclosure, relates to "one or more embodiments of the present disclosure." In addition, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

The features, principles and other aspects of the present disclosure are described in detail below.

An electronic imaging apparatus according to an exemplary implementation of the present disclosure may include a first image-picking apparatus and a second image-picking apparatus, where the first image-picking apparatus includes a first lens system and a first electronic photosensitive element located on an image plane of the first lens system, the second image-picking apparatus includes a second lens system and a second electronic photosensitive element located on an image plane of the second lens system.

In an exemplary implementation, the first lens system may include seven lenses (i.e., a second lens, a third lens, a fourth lens, a fifth lens, a sixth lens, and a seventh lens) having refractive powers sequentially arranged along an optical axis of the first lens system from an object side to an image side, where the first lens of the first lens system may have a positive refractive power and the second lens of the first lens system may have a negative refractive power. The second lens system may include seven lenses (i.e., a second lens, a third lens, a fourth lens, a fifth lens, a sixth lens, and a seventh lens) having refractive powers sequentially arranged along an optical axis of the second lens system from an object side to an image side, where the object-side surface of the first lens of the second lens system may be concave and an image-side surface of the first lens of the second lens system may be convex, the third lens of the second lens system may have a positive refractive power, the fourth lens of the second lens system may have a negative refractive power, and the fifth lens of the second lens system may have a positive refractive power. By rationally distributing the refractive powers of the first lens system and the second lens system, excessive concentration of the refractive powers in the corresponding system can be avoided, while conducive to the corresponding system to balance the axial chromatic aberration and the lateral chromatic aberration.

In an exemplary implementation, the first image-picking apparatus and the second image-picking apparatus may be located on the same side of the electronic imaging apparatus, so that they can capture objects located on the same side (e.g., the front side or the rear side of the electronic imaging apparatus) of the electronic imaging apparatus.

In an exemplary implementation, the electronic imaging apparatus of the present disclosure may satisfy the conditional expressions $35°<\text{Semi-FOV}_T<55°$ and $35°<\text{Semi-FOV}_W<55°$, where Semi-FOV$_T$ is half of a maximal field-of-view Semi-FOV$_T$ of the first lens system, Semi-FOV$_W$ is half of a maximal field-of-view Semi-FOV$_W$ of the second lens system. More specifically, Semi-FOV$_T$ may further satisfy $35°<\text{Semi-FOV}_T<38°$, for example, $36.7°\le\text{Semi-FOV}_T\le37.5°$, and Semi-FOV$_W$ may further satisfy $45°<\text{Semi-FOV}_T<55°$, for example, $49.7°\le\text{Semi-FOV}_W\le51.2°$. By satisfying the conditional expressions $35°<\text{Semi-FOV}_T<55°$ and $35°<\text{Semi-FOV}_W<55°$, it is possible to improve the height of the image formed by the system while avoiding excessive aberration at the edge field-of-view, which is conducive to better maintaining the characteristics of wide imaging range and high imaging quality of the system, and it may effectively ensure that the system can reach an open field-of-view during imaging, and ensure that the user has a good experience of shooting effect. In an exemplary implementation, the first lens system may have a telephoto characteristic (relative to the second lens system) and the second lens system may have a wide angle characteristic (relative to the first lens system).

In an exemplary implementation, the electronic imaging apparatus of the present disclosure may satisfy the conditional expression $4.7\text{ mm}<f_T<5.7\text{ mm}$ and $4.7\text{ mm}<f_W<5.7\text{ mm}$, where $f_T$ is total effective focal length of the first lens system, and $f_W$ is total effective focal length of the second lens system. More specifically, $f_T$ may further satisfy $5.0\text{ mm}<f_T<5.5\text{ mm}$, for example, $5.23\text{ mm}\le f_T\le5.39\text{ mm}$, and $f_W$ may further satisfy $4.82\text{ mm}\le f_W\le5.64\text{ mm}$; By satisfying $4.7\text{ mm}<f_T<5.7\text{ mm}$ and $4.7\text{ mm}<f_W<5.7\text{ mm}$, it ensures that the lens system has advantages in photographing an object at a relatively long distance, and has a long focal length, a small viewing angle and a large image, and ensures the clarity of the details of a photographed image, thereby achieving a more professional photographing effect.

In an exemplary implementation, the electronic imaging apparatus of the present disclosure may satisfy the conditional expressions $TTL_T/ImgH_T<1.4$ and $TTL_W/ImgH_W<1.4$, where $TTL_T$ is the distance on the optical axis of the first lens system from the object-side surface of the first lens of the first lens system to the image plane of the first lens system, $ImgH_T$ is half the diagonal length of the effective pixel area on the image plane of the first lens system, $TTL_W$ is the distance on the optical axis of the second lens system from the object-side surface of the first lens of the second lens system to the image plane of the second lens system, and $ImgH_W$ is half the diagonal length of the effective pixel area on the image plane of the second lens system. More specifically, $TTL_T$ and $ImgH_T$ may further satisfy $1.3<TTL_T/ImgH_T<1.4$, for example, $1.33 \leq TTL_T/ImgH_T \leq 1.37$, and $TTL_W$ and $ImgH_W$ may further satisfy $1.1<TTL_W/ImgH_W<1.3$, for example, $1.17 \leq TTL_W/ImgH_W \leq 1.25$. By satisfying the conditional expressions $TTL_T/ImgH_T<1.4$ and $TTL_W/ImgH_W<1.4$, the overall size of the lens system can be effectively reduced, and the ultra-thin characteristics and miniaturization of the lens system can be achieved, thereby enabling the lens system to be better adapted to more and more ultra-thin electronic products on the market.

In an exemplary implementation, the electronic imaging apparatus of the present disclosure may satisfy the conditional expressions: $-1.4<f7_T/f_T<-0.7$ and $-1.4<f7_W/f_W<-0.7$, where $f_T$ is the total effective focal length of the first lens system, $f7_T$ is the effective focal length of the seventh lens of the first lens system, $f_W$ is the total effective focal length of the second lens system, and $f7_W$ is the effective focal length of the seventh lens of the second lens system. More specifically, $f7_T$ and $f_T$ may further satisfy $-0.9<f7_T/f_T<-0.7$, for example $-0.88 \leq f7_T/f_T \leq -0.72$, and $f7_W$ and $f_W$ may further satisfy $-1.4<f7_W/f_W<-0.8$, for example $-1.39 \leq f7_W/f_W \leq -0.85$. By satisfying the conditional expressions $-1.4<f7_T/f_T<-0.7$ and $-1.4<f7_W/f_W<-0.7$, it ensures that the system has a stronger ability for correcting aberrations while maintaining the smaller system size.

In an exemplary implementation, the electronic imaging apparatus of the present disclosure may satisfy the conditional expressions: $0.4<(CT1_T+CT2_T)/TTL_T \times 5<1.0$ and $0.4<(CT1_W+CT2_W)/TTL_W \times 5<1.0$, where $TTL_T$ is the distance on the optical axis of the first lens system from the object-side surface of the first lens of the first lens system to the image plane of the first lens system, $CT1_T$ is the center thickness of the first lens of the first lens system on the optical axis of the first lens system, $CT2_T$ is the center thickness of the second lens of the first lens system on the optical axis of the first lens system, and $TTL_W$ is the distance on the optical axis of the second lens system from the object-side surface of the first lens of the second lens system to the image plane of the second lens system, $CT1_W$ is the center thickness of the first lens of the second lens system on the optical axis of the second lens system, and $CT2_W$ is the center thickness of the second lens of the second lens system on the optical axis of the second lens system. More specifically, $CT1_T$, $CT2_T$, and $TTL_T$ may further satisfy $0.8<(CT1_T+CT2_T)/TTL_T \times 5<1.0$, for example, $0.85 \leq (CT1_T+CT2_T)/TTL_T \times 5 \leq 0.91$, and $CT1_W$, $CT2_W$, and $TTL_W$ may further satisfy $0.4<(CT1_W+CT2_W)/TTL_W \times 5<0.7$, for example, $0.42 \leq (CT1_W+CT2_W)/TTL_W \times 5 \leq 0.58$. By satisfying the conditional expressions $0.4<(CT1_T+CT2_T)/TTL_T \times 5<1.0$ and $0.4<(CT1_W+CT2_W)/TTL_W \times 5<1.0$, it improves the leakage of light at the edge field of view, improves the stray light and ghosts image, improves the illumination on the image plane on the basis of the comprehensive improvement of the stray light and ghosts image, and avoids the processing difficulties caused by the over-thin lens.

In an exemplary implementation, in a first lens system, any two adjacent lenses may have an air spacing on the optical axis of the first lens system, and in a second lens system, any two adjacent lenses may have an air spacing on the optical axis of the second lens system. A certain amount of air spacing is provided between adjacent lenses to improve the longitudinal spherical aberration of the lens system and the ghost image at the center of the image plane. At the same time, it is ensured that there is no optical achromatic lens in both lens systems to facilitate post-processing and assembly. In addition, the addition of a spacer at an air spacings can also enhance the robustness of the system structure, so that the system stray light is improved while the ultra-thin characteristics is maintained.

In an exemplary implementation, at least five lenses in the first to the seventh lens in the first lens system may be plastic lenses, and the at least five lenses of the first lens to the seventh lens in the second lens system may be plastic lenses. Because the processing process of the plastic lenses is simple, it is favorable for mechanized large-scale production, and because the plastic material is light in quality and good in performance design, it is easier to achieve better design performance, meanwhile, the plastic material is good in chemical stability and low in cost compared with other materials, so that the cost of the combined lens can be ensured.

The first lens system or the second lens system according to the above-described implementations of the present disclosure may each employ a plurality of pieces of lenses, such as seven pieces described above. For any one of the lens systems, the volume of the lens system can be effectively reduced, the sensitivity of the lens system can be reduced, and the processability of the lens system can be improved by rationally distributing the refractive power of each lens, the surface profile, the center thickness of each lens, the on-axis spacing between the respective lenses, and the like, so that the lens system is more favorable for production processing and can be applied to a portable electronic imaging apparatus.

Figure 17:
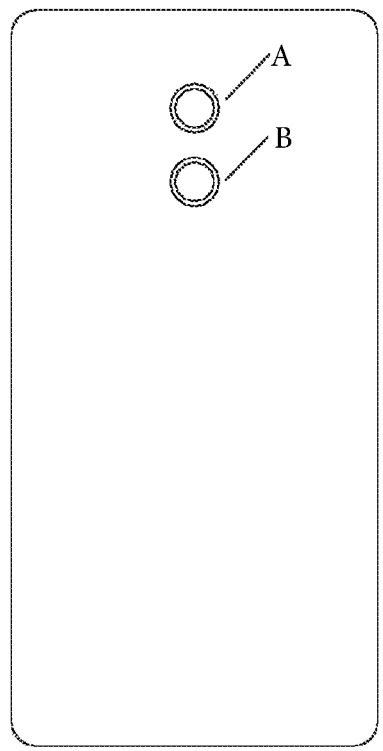
FIGS. 17-18 illustrate schematic diagrams of different arrangements of the first and second image-picking apparatus according to the present disclosure.
Figure 18:
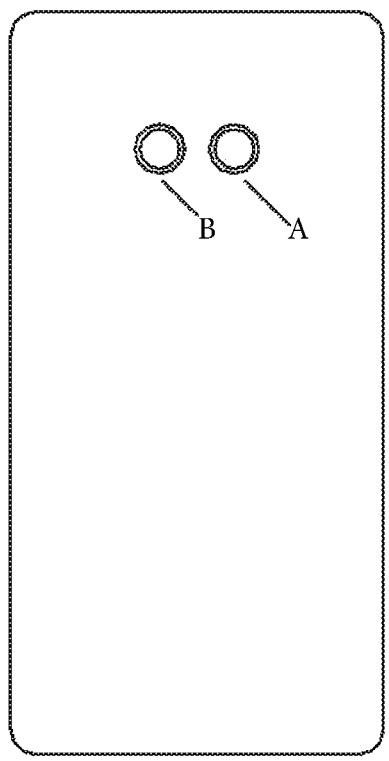

In an exemplary implementation, the first image-picking apparatus and the second image-picking apparatus may be longitudinally or laterally arranged on one side of the electronic imaging apparatus. The length difference between the first lens system and the second lens system can be controlled to be within a reasonable range by a longitudinal arrangement or a lateral arrangement, to facilitate assembly of the modules; By arranging the first and second image-picking apparatus in the longitudinal direction or in the lateral direction so as to be adjacent to each other, on the one hand it ensures the chips placed inside the electronic imaging apparatus to be arranged in a more regular manner, to make the arrangement and wiring of the internal components easier, on the other hand the appearance may be improved, and it is more convenient for a user to hold the apparatus for shooting a picture without overly considering whether a camera is blocked by improper holding posture of the user. It should be understood that the "longitudinal arrangement" is understood to mean that, as shown in FIG. 17, the first image-picking apparatus A and the second image-picking apparatus B are in an up-down arrangement mode with respect to the use direction of the electronic imaging apparatus, while the "lateral arrangement" is understood to mean that, as shown in FIG. 18, the first image-picking apparatus A and the second image-picking apparatus B are in an left-right arrangement mode with respect to the use direction of the electronic imaging apparatus. At the same time, it should be further understood that the arrangement of the first image-picking apparatus and the second image-picking apparatus is not limited thereto, and the relative position thereof can be adjusted according to actual design requirements. In addition, it should be noted that in the electronic imaging apparatus according to the present disclosure, the optical axis of the first lens system and the optical axis of the second lens system are parallel to each other.

In an exemplary implementation, the electronic imaging apparatus may be, for example, a smartphone, and the images may be captured using different image-picking modes to achieve a zooming effect. By combining the first lens system and the second lens system, it is possible to realize the better zoom telephoto function while meeting the high imaging quality, and meet the user's demands for the imaging quality of the portable electronic product and the professional photography function. It should be understood that the type of the electronic imaging apparatus according to the present disclosure is not limited to the above-mentioned smartphone, and may be other types of electronic devices such as a tablet computer or an imaging module integrated to the electronic apparatus. Further, the electronic photosensitive element carried by the first image-picking apparatus or the second image-picking apparatus may be a charge coupled device (CCD) or a complementary metal-oxide semiconductor (CMOS).

The present disclosure is further described in detail below in combination with the specific embodiments.

(I) The First Lens System

The first lens system according to the present disclosure may include, for example, seven lenses having refractive powers, specifically, a first lens, a second lens, a third lens, a fourth lens, a fifth lens, a sixth lens, and a seventh lens. The seven lenses are sequentially arranged along the optical axis of the first lens system from the object side to the image side. The first lens of the first lens system may have a positive refractive power and the second lens of the first lens system may have a negative refractive power.

In an exemplary implementation, the seventh lens of the first lens system may have a negative refractive power, where the object-side surface thereof may be concave, and the image-side surface thereof may be concave. By ensuring that the seventh lens of the first lens system has a negative refractive power, and both the object-side surface and the image-side surface thereof are concave, the light rays may be diverged, and further with the cooperation of the refractive powers of the first to the sixth lens, the imaging plane is increased and better imaging quality is ensured.

In an exemplary implementation, the electronic imaging apparatus of the present disclosure may satisfy the conditional expression $-0.6<f1_T/f2_T<-0.2$, where $f1_T$ is the effective focal length of the first lens of the first lens system and $f2_T$ is the effective focal length of the second lens of the first lens system. More specifically, $f1_T$ and $f2_T$ may further satisfy $-0.5<f1_T/f2_T<-0.4$, for example, $-0.49 \leq f1_T/f2_T \leq -0.41$. By reasonably adjusting the refractive powers of the first lens and the second lens of the first lens system so that the refractive powers satisfy $-0.6<f1_T/f2_T<-0.2$, the excessive concentration of the refractive power can be effectively avoided, the aberration correction capability of the first lens system can be improved, and the size of the first lens system can be effectively reduced, so that the telephoto characteristic of the first lens system can be more highlighted.

In an exemplary implementation, the electronic imaging apparatus of the present disclosure may satisfy the conditional expression: $0.7<(R2_T-R1_T)/(R3_T-R4_T)<1.3$, where $R2_T$ is the radius of curvature of the image-side surface of the first lens of the first lens system, $R1_T$ is the radius of curvature of the object-side surface of the first lens of the first lens system, $R3_T$ is the radius of curvature of object-side surface of the second lens of the first lens system, and $R4_T$ is the radius of curvature of the image-side surface of the second lens of the first lens system. More specifically, $R2_T$, $R1_T$, $R3_T$ and $R4_T$ may further satisfy $0.78 \leq (R2_T-R1_T)/(R3_T-R4_T) \leq 1.29$. By reasonably distributing the radius of curvatures of the object-side surface and the image-side surface of the first and second lens in the first lens system, the chromatic aberration of the first lens system can be effectively corrected, and various aberrations can be balanced. Alternatively, the object-side surface of the first lens of the first lens system may be convex and the image-side surface of the first lens of the first lens system may be concave; the object-side surface of the second lens of the first lens system may be convex and the image-side surface of the second lens of the first lens system may be concave.

In an exemplary implementation, the electronic imaging apparatus of the present disclosure may satisfy the conditional expression $0.5<(R11_T+R12_T)/(R9_T+R10_T)<0.9$, where $R11_T$ is the radius of curvature of the object-side surface of the sixth lens of the first lens system, $R12_T$ is the radius of curvature of the image-side surface of the sixth lens of the first lens system, $R9_T$ is radius of curvature of the object-side surface of the fifth lens of the first lens system, and $R10_T$ is the radius of curvature of the image-side surface of the fifth lens of the first lens system. More specifically, $R11_T$, $R12_T$, $R9_T$ and $R10_T$ may further satisfy $0.53 \leq (R11_T+R12_T)/(R9_T+R10_T+) \leq 0.89$. By reasonably distributing the radius of curvatures of the object-side surface and the image-side surface of the fifth lens, the sixth lens and the seventh lens in the first lens system, the astigmatism and the coma between the fifth lens, the sixth lens and the first to the fourth lens can be effectively balanced, so that the first lens system can maintain better imaging quality. Alternatively, the object-side surface of the fifth lens of the first lens system may be concave and the image-side surface of the fifth lens of the first lens system may be convex; the object-side surface of the sixth lens of the first lens system may be concave and the image-side surface of the sixth lens of the first lens system may be convex.

In an exemplary implementation, the electronic imaging apparatus of the present disclosure may satisfy the conditional expression $f_T/EPD_T \leq 2.10$, where $f_T$ is the total effective focal length of the first lens system and $EPD_T$ is the entrance pupil diameter of the first lens system. More specifically, $f_T$ and $EPD_T$ may further satisfy $2.0 \leq f_T/EPD_T \leq 2.1$, for example, $2.05 \leq f_T/EPD_T \leq 2.10$. By satisfying the conditional expression $f_T/EPD_T \leq 2.10$, the light flux of the first lens system can be effectively increased, so that the first lens system has a high relative illumination, a good shooting effect can be ensured in a dark environment, and the imaging quality can be ensured.

In an exemplary implementation, the first lens system described above may further include at least one diaphragm. The diaphragm may be provided in an appropriate position as desired, for example, between the object side and the first lens. Alternatively, the first lens system described above may further include an optical filter for correcting color deviations and/or a protective glass for protecting the photosensitive element located on image plane.

In the implementations of the present disclosure, at least one of the surfaces of lenses in the first lens system is an aspheric surface, that is, at least one of the object-side surface and the image-side surface of each of the first lens, the second lens, the third lens, the fourth lens, the fifth lens, the sixth lens, and the seventh lens is an aspheric surface.

The aspheric lens is characterized in that the curvature varies continuously from the center of the lens to the periphery of the lens. Unlike a spherical lens having a constant curvature from the center of the lens to the periphery of the lens, the aspheric lens has better radius of curvature characteristics, and has the advantages of improving the distortion aberration and the astigmatism aberration. With the aspherical lens, aberrations occurring at the time of imaging can be eliminated as much as possible, thereby improving the imaging quality. Alternatively, the object-side surface and the image-side surface of each of the first lens, the second lens, the third lens, the fourth lens, the fifth lens, the sixth lens, and the seventh lens of the first lens system are aspherical mirror surfaces.

Various embodiments of the first lens system according to the present disclosure will be further described below with reference to FIGS. 1 to 8D.

Embodiment 1

A first lens system according to Embodiment 1 of the present disclosure is described with reference to FIGS. 1 to 2D. FIG. 1 illustrates a schematic structural diagram illustrating the first lens system according to Embodiment 1.

As shown in FIG. 1, the first lens system includes, sequentially along the optical axis from the object side to the image side: a diaphragm STO, a first lens E1, a second lens E2, a third lens E3, a fourth lens E4, a fifth lens E5, a sixth lens E6, a seventh lens E7, an optical filter E8, and an image plane S17.

The first lens E1 has a positive refractive power, the object-side surface S1 thereof is a convex surface and the image-side surface S2 thereof is a concave surface. The second lens E2 has a negative refractive power, the object-side surface S3 thereof is a convex surface and the image-side surface S4 thereof is a concave surface. The third lens E3 has a positive refractive power, the object-side surface S5 thereof is a convex surface and the image-side surface S6 thereof is a concave surface. The fourth lens E4 has a positive refractive power, the object-side surface S7 thereof is a convex surface and the image-side surface S8 thereof is a concave surface. The fifth lens E5 has a positive refractive power, the object-side surface S9 thereof is a concave surface and the image-side surface S10 thereof is a convex surface. The sixth lens E6 has a negative refractive power, the object-side surface S11 thereof is a concave surface and the image-side surface S12 thereof is a convex surface. The seventh lens E7 has a negative refractive power, the object-side surface S13 thereof is a concave surface and the image-side surface S14 thereof is a concave surface. The optical filter E8 has an object-side surface S15 and an image-side surface S16. Light from the object sequentially passes through the respective surfaces S1 to S16 and is finally form an image on image plane S17. In the present embodiment, the first lens E1 to the seventh lens E7 may be plastic lenses.

Table 1 below shows a basic parameter table of the first lens system of Embodiment 1, where the radius of curvature, the thickness and the focal length are all in millimeters (mm).

TABLE 1

Embodiment 1: $f_T$ = 5.36 mm, $TTL_T$ = 5.50 mm, $ImgH_T$ = 4.15 mm, Semi-$FOV_T$ = 37.1°

| surface number | surface type | radius of curvature | thickness | refractive index | abbe number | Material | focal length | conic coefficient |
|---|---|---|---|---|---|---|---|---|
| OBJ | spherical | infinite | infinite | | | | | |
| STO | spherical | infinite | −0.5348 | | | | | |
| S1 | aspheric | 1.7054 | 0.7481 | 1.547 | 56.11 | Plastic | 3.46 | −0.8896 |
| S2 | aspheric | 14.6455 | 0.0405 | | | | | 8.5098 |
| S3 | aspheric | 13.4741 | 0.2400 | 1.668 | 20.40 | Plastic | −7.01 | 11.8678 |
| S4 | aspheric | 3.4533 | 0.1505 | | | | | 1.2599 |
| S5 | aspheric | 5.1017 | 0.3862 | 1.547 | 56.11 | Plastic | 33.78 | 3.1692 |
| S6 | aspheric | 6.8618 | 0.2207 | | | | | 6.5846 |
| S7 | aspheric | 8.0116 | 0.2900 | 1.646 | 23.49 | Plastic | 56.21 | 2.4719 |
| S8 | aspheric | 10.1331 | 0.3686 | | | | | −19.4376 |
| S9 | aspheric | −5.5197 | 0.2639 | 1.668 | 20.40 | Plastic | 29.91 | −84.9482 |
| S10 | aspheric | −4.4090 | 0.4442 | | | | | −66.2806 |
| S11 | aspheric | −4.3136 | 0.3427 | 1.547 | 56.11 | Plastic | −352.67 | −38.6058 |
| S12 | aspheric | −4.5362 | 0.6248 | | | | | 3.3011 |
| S13 | aspheric | −5.6280 | 0.5922 | 1.537 | 55.74 | Plastic | −4.73 | −12.7963 |
| S14 | aspheric | 4.8115 | 0.2769 | | | | | −23.8510 |
| S15 | spherical | infinite | 0.1100 | 1.517 | 64.17 | Glass | | |
| S16 | spherical | infinite | 0.4000 | | | | | |
| S17 | spherical | infinite | | | | | | |

Where $f_T$ is total effective focal length of the first lens system, $TTL_T$ is the distance on the optical axis of the first lens system from the object-side surface S1 of the first lens E1 of the first lens system to the image plane S17 of the first lens system, $ImgH_T$ is half of the diagonal length of the effective pixel area on the image plane S17 of the first lens system, and Semi-$FOV_T$ is half of the maximal field of view of the first lens system.

In embodiment 1, the object-side surface and the image-side surface of each of the first lens, the second lens, the third lens, the fourth lens, the fifth lens, the sixth lens, and the seventh lens of the first lens system are aspherical surfaces, and the surface type x of each aspheric surface is defined by the following formula:

$$x = \frac{ch^2}{1 + \sqrt{1-(k+1)c^2h^2}} + \sum A_i h^i \qquad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 2 above); and $A_i$ is the correction coefficient of the $i^{th}$ order of the aspheric surface. Table 2 below shows the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S14 in Embodiment 1.

TABLE 2

| Surface Number | A4 | A6 | A8 | A10 | A12 | A14 | A16 | A18 | A20 |
|---|---|---|---|---|---|---|---|---|---|
| S1 | 1.9981E−02 | −1.3049E−02 | 6.4247E−02 | −1.5748E−01 | 2.3501E−01 | −2.1705E−01 | 1.2008E−01 | −3.6519E−02 | 4.6596E−03 |
| S2 | −2.9461E−02 | 1.4228E−01 | −2.7068E−01 | 3.5977E−01 | −3.8123E−01 | 3.1856E−01 | −1.8489E−01 | 6.1984E−02 | −8.7877E−03 |
| S3 | −4.9260E−02 | 2.1637E−01 | −4.0965E−01 | 5.5276E−01 | −5.5842E−01 | 4.3458E−01 | −2.4170E−01 | 8.0757E−02 | −1.1643E−02 |
| S4 | −4.3274E−02 | 1.5040E−01 | −2.6522E−01 | 5.5414E−01 | −9.9015E−01 | 1.3562E+00 | −1.1846E+00 | 5.5418E−01 | −1.0449E−01 |
| S5 | −1.6951E−02 | 9.9301E−02 | −8.7505E−02 | 2.2233E−01 | −3.6984E−01 | 4.8093E−01 | −4.0545E−01 | 1.7787E−01 | −2.8949E−02 |
| S6 | −1.9895E−02 | 1.7270E−02 | 3.1139E−01 | −1.3909E+00 | 3.8660E+00 | −6.5184E+00 | 6.5780E+00 | −3.6309E+00 | 8.4710E−01 |
| S7 | −1.1424E−01 | −3.6018E−03 | 8.0152E−02 | −2.4922E−01 | 4.6736E−01 | −5.6730E−01 | 4.5909E−01 | −2.2859E−01 | 5.2945E−02 |
| S8 | −9.7608E−02 | −2.5186E−03 | −9.3522E−02 | 3.5023E−01 | −7.4980E−01 | 9.3474E−01 | −6.6651E−01 | 2.4852E−01 | −3.6410E−02 |
| S9 | −7.4936E−02 | −2.4770E−01 | 1.0808E+00 | −3.2266E+00 | 5.8865E+00 | −6.7553E+00 | 4.7039E+00 | −1.8115E+00 | 2.9622E−01 |
| S10 | −8.5988E−02 | −3.8878E−02 | 1.6135E−01 | −3.4941E−01 | 4.3340E−01 | −3.3496E−01 | 1.5627E−01 | −3.8969E−02 | 3.9195E−03 |
| S11 | −6.8509E−02 | −1.5564E−01 | 2.0050E−01 | −1.1528E−01 | −5.8955E−02 | 1.4805E−01 | −1.0220E−01 | 3.1909E−02 | −3.7916E−03 |
| S12 | 2.0941E−02 | −1.7321E−01 | 2.3856E−01 | −2.1897E−01 | 1.3696E−01 | −5.4778E−02 | 1.3278E−02 | −1.7768E−03 | 1.0073E−04 |
| S13 | −7.2339E−02 | 1.5572E−02 | 5.6500E−03 | −3.3500E−03 | 7.4781E−04 | −9.3174E−05 | 6.7548E−06 | −2.6305E−07 | 4.1664E−09 |
| S14 | −6.5782E−02 | 2.6850E−02 | −8.8525E−03 | 2.2294E−03 | −4.1599E−04 | 5.3713E−05 | −4.3917E−06 | 1.9999E−07 | −3.7909E−09 |

Figure 2A:
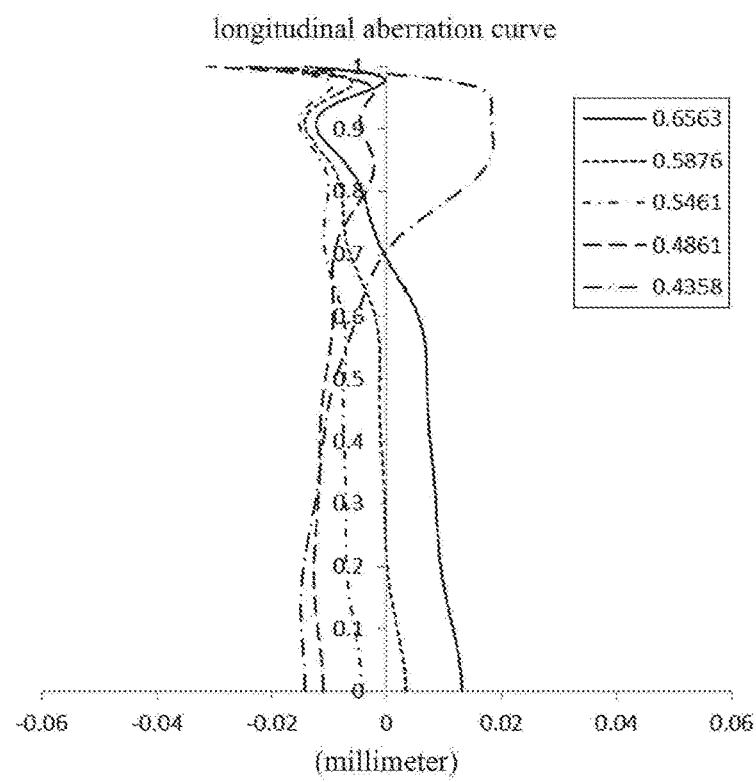
FIGS. 2A-2D respectively illustrate a longitudinal aberration curve, an astigmatic curve, a distortion curve and a lateral color curve of the first lens system according to Embodiment 1.
Figure 2B:
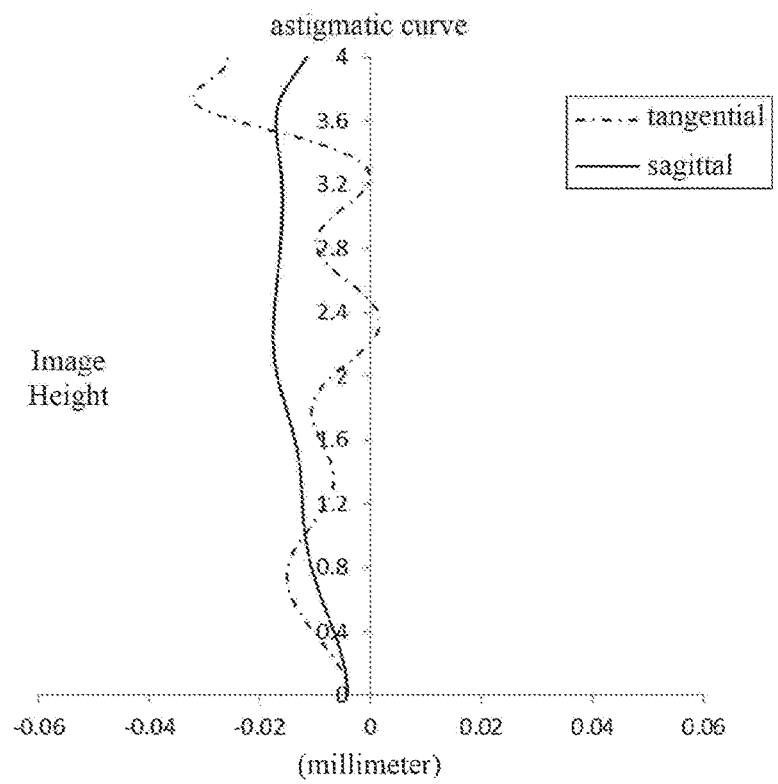
Figure 2C:
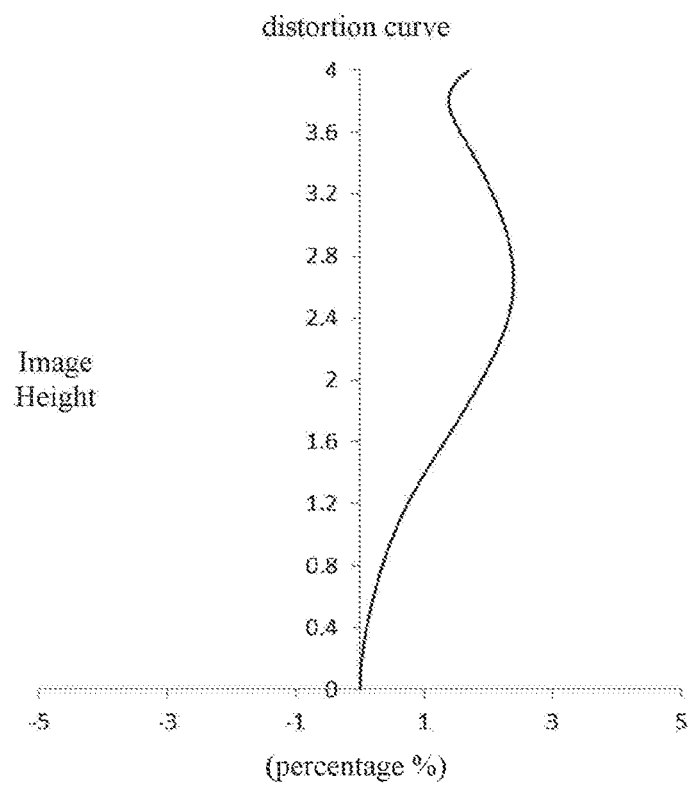
Figure 2D:
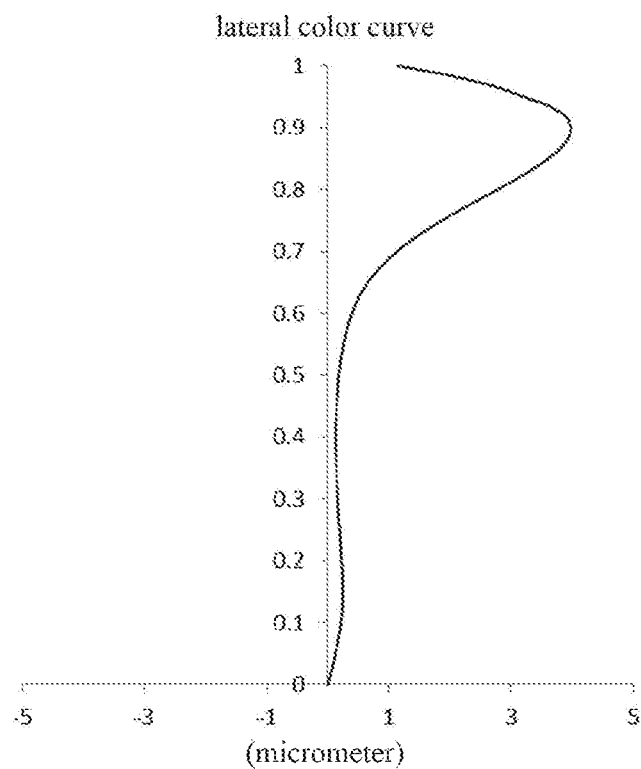

FIG. 2A illustrates the longitudinal aberration curve of the first lens system according to Embodiment 1, representing deviations of focal points converged by lights of different wavelengths after passing through the lens assembly. FIG. 2B illustrates the astigmatic curve of the first lens system according to Embodiment 1, representing a curvature of the tangential image plane and a curvature of the sagittal image plane. FIG. 2C illustrates the distortion curve of the first lens system according to Embodiment 1, representing amounts of distortion at different viewing angles. FIG. 2D illustrates the lateral color curve of the first lens system according to Embodiment 1, representing deviations of different image heights on the image plane after light passing through the lens assembly. In summary, with reference to FIGS. 2A to 2D, the first lens system according to Embodiment 1 can achieve good imaging quality.

Embodiment 2

Figure 3:
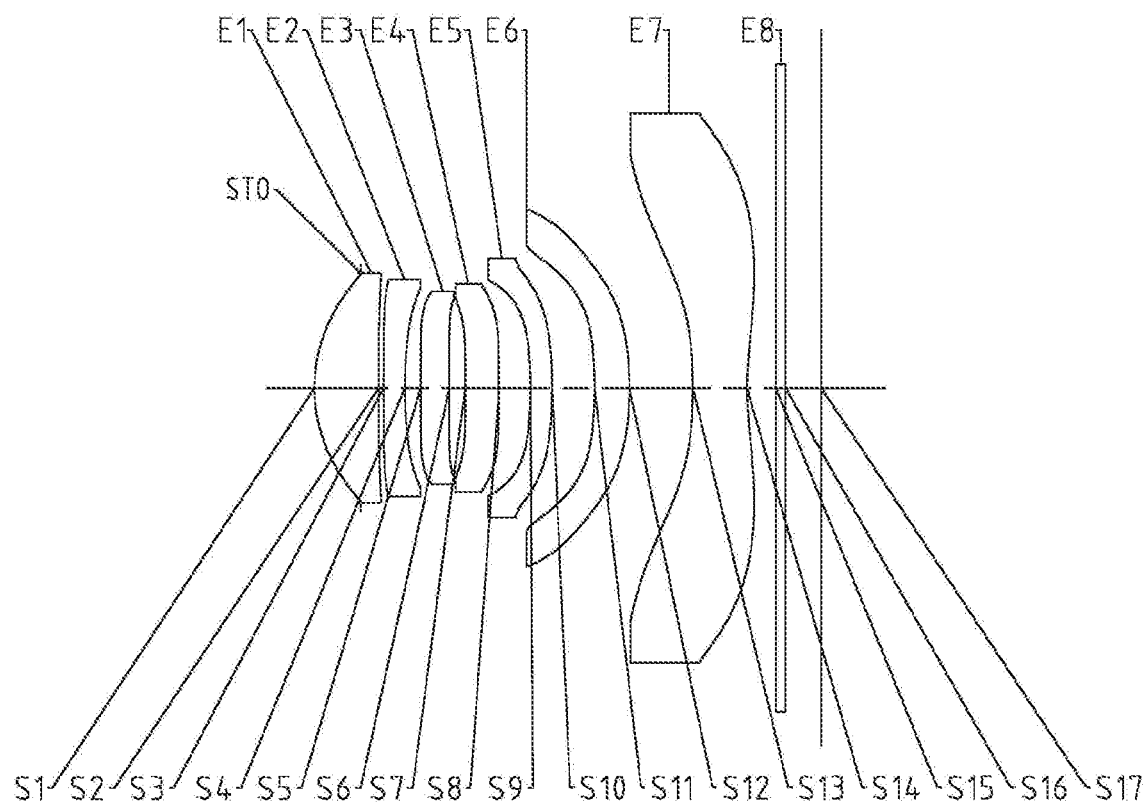
FIG. 3 is a schematic structural diagram illustrating a first lens system according to Embodiment 2.

A first lens system according to Embodiment 2 of the present disclosure is described with reference to FIGS. 3 to 4D. In the present embodiment and the following embodiments, the description similar to Embodiment 1 will be omitted for brevity. FIG. 3 is a schematic structural diagram illustrating the first lens system according to Embodiment 2.

As shown in FIG. 3, the first lens system includes, sequentially along the optical axis from the object side to the image side: a diaphragm STO, a first lens E1, a second lens E2, a third lens E3, a fourth lens E4, a fifth lens E5, a sixth lens E6, a seventh lens E7, an optical filter E8, and the image plane S17.

The first lens E1 has a positive refractive power, the object-side surface S1 thereof is a convex surface and the image-side surface S2 thereof is a concave surface. The second lens E2 has a negative refractive power, the object-side surface S3 thereof is a convex surface and the image-side surface S4 thereof is a concave surface. The third lens E3 has a negative refractive power, the object-side surface S5 thereof is a concave surface and the image-side surface S6 thereof is a concave surface. The fourth lens E4 has a positive refractive power, the object-side surface S7 thereof is a convex surface and the image-side surface S8 thereof is a concave surface. The fifth lens E5 has a negative refractive power, the object-side surface S9 thereof is a concave surface and the image-side surface S10 thereof is a convex surface. The sixth lens E6 has a positive refractive power, the object-side surface S11 thereof is a concave surface and the image-side surface S12 thereof is a convex surface. The seventh lens E7 has a negative refractive power, the object-side surface S13 thereof is a concave surface and the image-side surface S14 thereof is a concave surface. The optical filter E8 has an object-side surface S15 and an image-side surface S16. Light from the object sequentially passes through the respective surfaces S1 to S16 and is finally form an image on image plane S17. In the present embodiment, the first lens E1 to the seventh lens E7 may be plastic lenses.

Table 3 below shows a basic parameter table of the first lens system of Embodiment 2, where the radius of curvature, the thickness and the focal length are all in millimeters (mm). Table 4 below shows the high-order coefficients applicable to the aspheric surfaces in Embodiment 2. The surface type of each aspheric surface may be defined by the formula (1) given in Embodiment 1.

TABLE 3

Embodiment 2: $f_T$ = 5.39 mm, $TTL_T$ = 5.67 mm, $ImgH_T$ = 4.15 mm, Semi-FOV$_T$ = 37.1°

| surface number | surface type | radius of curvature | thickness | refractive index | abbe number | Material | focal length | conic coefficient |
|---|---|---|---|---|---|---|---|---|
| OBJ | spherical | infinite | infinite | | | | | |
| STO | spherical | infinite | −0.5201 | | | | | |
| S1 | aspheric | 1.7302 | 0.7180 | 1.547 | 56.11 | Plastic | 3.26 | −0.9097 |
| S2 | aspheric | 49.5932 | 0.0537 | | | | | 14.5874 |
| S3 | aspheric | 66.6158 | 0.2400 | 1.668 | 20.40 | Plastic | −8.01 | 19.1431 |
| S4 | aspheric | 4.9498 | 0.1770 | | | | | −0.0987 |
| S5 | aspheric | −276.5198 | 0.3212 | 1.547 | 56.11 | Plastic | −462.35 | −62.3679 |
| S6 | aspheric | 2925.5708 | 0.1770 | | | | | 1.2622 |
| S7 | aspheric | 50.0566 | 0.3774 | 1.646 | 23.49 | Plastic | 120.74 | −98.9966 |
| S8 | aspheric | 139.2841 | 0.3526 | | | | | −27.0789 |
| S9 | aspheric | −5.5927 | 0.2428 | 1.668 | 20.40 | Plastic | −2609.19 | −63.0369 |
| S10 | aspheric | −5.7083 | 0.4733 | | | | | −80.0991 |
| S11 | aspheric | −6.0666 | 0.3905 | 1.547 | 56.11 | Plastic | 16.05 | −59.9555 |
| S12 | aspheric | −3.6678 | 0.7098 | | | | | 1.8501 |
| S13 | aspheric | −6.4571 | 0.6047 | 1.537 | 55.74 | Plastic | −4.09 | −3.1574 |
| S14 | aspheric | 3.4370 | 0.3220 | | | | | −21.8563 |
| S15 | spherical | infinite | 0.1100 | 1.517 | 64.17 | Glass | | |
| S16 | spherical | infinite | 0.4000 | | | | | |
| S17 | spherical | infinite | | | | | | |

TABLE 4

| Surface Number | A4 | A6 | A8 | A10 | A12 | A14 | A16 | A18 | A20 |
|---|---|---|---|---|---|---|---|---|---|
| S1 | 1.8463E−02 | 6.9082E−04 | 1.5268E−02 | −5.6094E−02 | 1.0949E−01 | −1.2521E−01 | 8.2701E−02 | −2.9348E−02 | 4.2787E−03 |
| S2 | −3.0563E−02 | 1.0881E−01 | −1.7602E−01 | 2.6609E−01 | −3.8896E−01 | 4.2595E−01 | −2.9221E−01 | 1.0895E−01 | −1.6700E−02 |
| S3 | −4.0763E−02 | 1.6333E−01 | −2.5825E−01 | 3.5799E−01 | −4.8634E−01 | 5.4701E−01 | −4.0422E−01 | 1.6395E−01 | −2.7190E−02 |
| S4 | −2.3950E−02 | 1.0218E−01 | −2.4473E−01 | 7.1977E−01 | −1.5861E+00 | 2.2670E+00 | −1.8828E+00 | 8.1567E−01 | −1.4218E−01 |
| S5 | 6.9184E−03 | 1.1610E−01 | −4.9925E−01 | 1.8155E+00 | −3.8962E+00 | 5.2599E+00 | −4.2523E+00 | 1.8716E+00 | −3.4553E−01 |
| S6 | −8.1350E−03 | 6.0984E−02 | −2.1186E−01 | 8.0151E−01 | −1.7831E+00 | 2.6105E+00 | −2.3550E+00 | 1.1963E+00 | −2.5663E−01 |
| S7 | −1.1613E−01 | −6.0700E−03 | −1.7833E−02 | 3.7757E−02 | 2.7808E−02 | −2.1480E−01 | 3.9294E−01 | −3.1777E−01 | 9.9628E−02 |
| S8 | −9.1469E−02 | −6.7036E−02 | 2.1082E−01 | −5.6912E−01 | 1.0002E+00 | −1.1181E+00 | 7.7532E−01 | −3.0475E−01 | 5.1895E−02 |
| S9 | −1.1225E−01 | −1.0508E−02 | −8.2671E−02 | 2.8695E−01 | −5.5794E−01 | 5.6718E−01 | −3.0094E−01 | 6.3988E−02 | 6.5515E−04 |
| S10 | −1.0934E−01 | 6.8001E−02 | −2.1144E−01 | 4.9545E−01 | −7.2324E−01 | 6.4940E−01 | −3.5215E−01 | 1.0544E−01 | −1.3230E−02 |
| S11 | −1.0312E−01 | 4.1465E−03 | −9.7567E−02 | 2.2819E−01 | −2.8314E−01 | 2.1355E−01 | −9.6203E−02 | 2.3460E−02 | −2.3517E−03 |
| S12 | −1.2701E−02 | −5.9420E−02 | 7.0822E−02 | −6.1600E−02 | 3.8638E−02 | −1.5236E−02 | 3.6004E−03 | −4.7312E−04 | 2.6736E−05 |
| S13 | −8.5748E−02 | 4.7475E−02 | −1.7880E−02 | 5.3289E−03 | −1.1271E−03 | 1.5632E−04 | −1.3444E−05 | 6.5236E−07 | −1.3707E−08 |
| S14 | −5.1957E−02 | 2.2901E−02 | −7.8896E−03 | 1.9519E−03 | −3.4615E−04 | 4.2098E−05 | −3.2743E−06 | 1.4505E−07 | −2.7586E−09 |

Figure 4A:
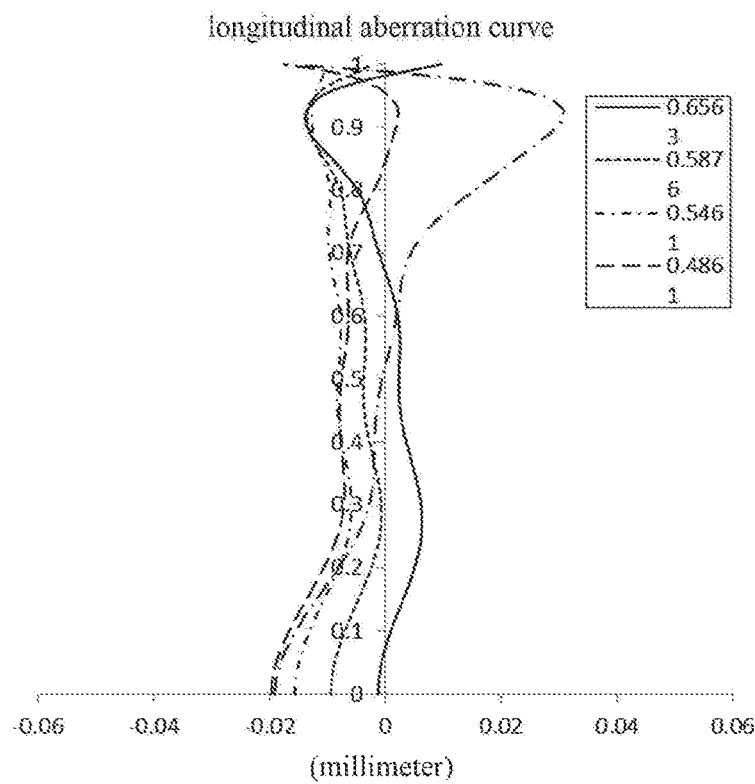
FIGS. 4A-4D respectively illustrate a longitudinal aberration curve, an astigmatic curve, a distortion curve and a lateral color curve of the first lens system according to Embodiment 2.
Figure 4B:
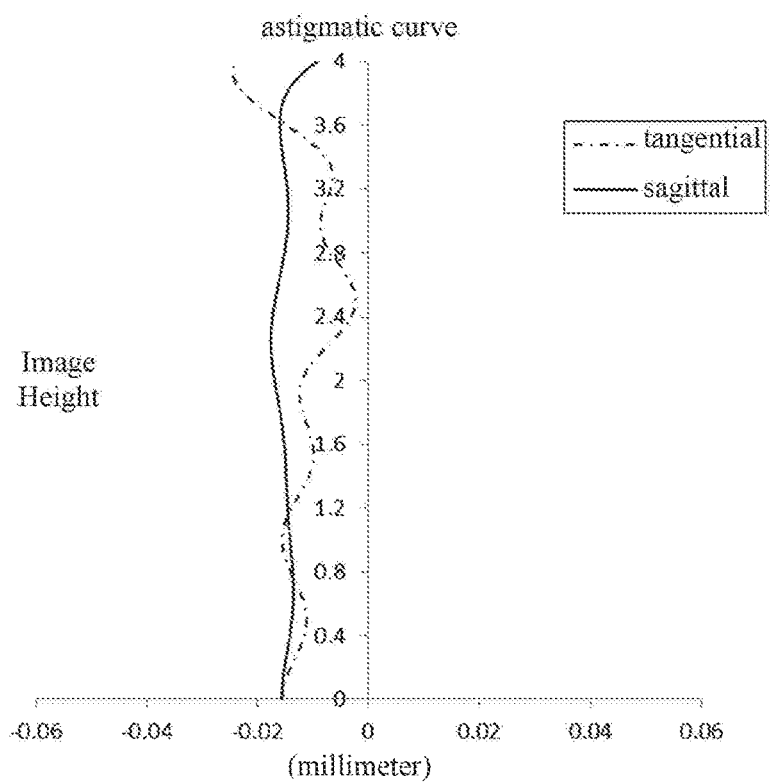
Figure 4C:
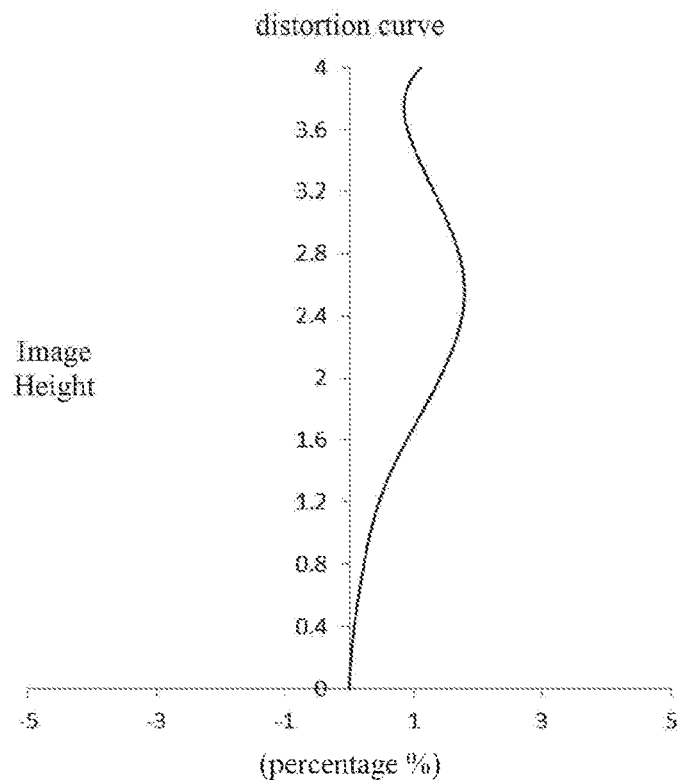
Figure 4D:
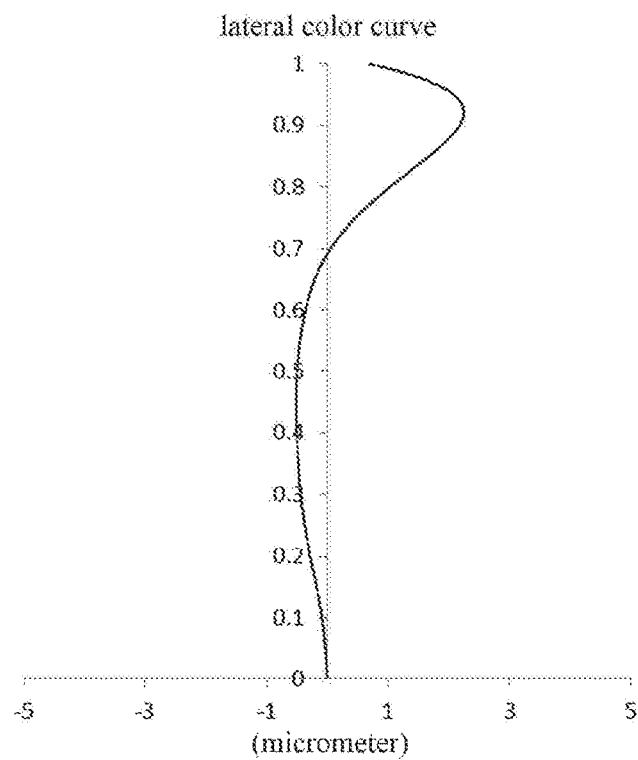

FIG. 4A illustrates the longitudinal aberration curve of the first lens system according to Embodiment 2, representing deviations of focal points converged by lights of different wavelengths after passing through the lens assembly. FIG. 4B illustrates the astigmatic curve of the first lens system according to Embodiment 2, representing a curvature of the tangential image plane and a curvature of the sagittal image plane. FIG. 4C illustrates the distortion curve of the first lens system according to Embodiment 2, representing amounts of distortion at different viewing angles. FIG. 4D illustrates the lateral color curve of the first lens system according to Embodiment 2, representing deviations of different image heights on the image plane after light passing through the lens assembly. In summary, with reference to FIGS. 4A to 4D, the first lens system according to Embodiment 2 can achieve good imaging quality.

Embodiment 3

Figure 5:
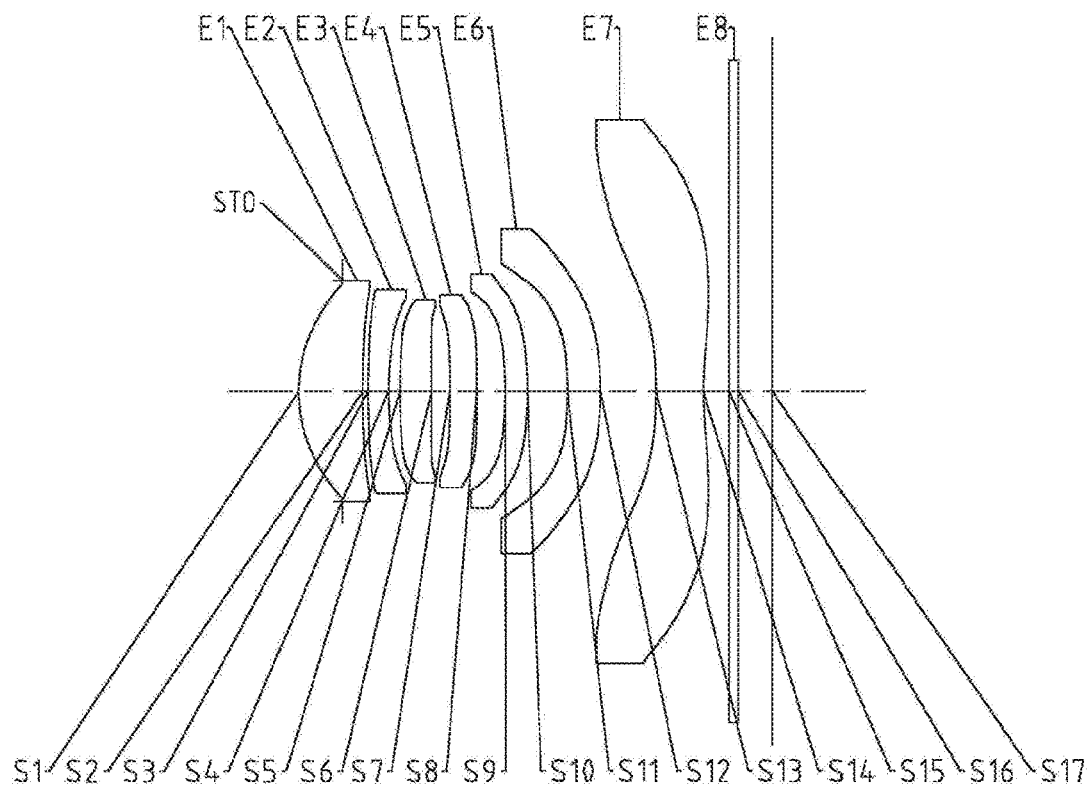
FIG. 5 is a schematic structural diagram illustrating a first lens system according to Embodiment 3.

A first lens system according to Embodiment 3 of the present disclosure is described with reference to FIGS. 5 to 6D. FIG. 5 is a schematic structural diagram illustrating the first lens system according to Embodiment 2.

As shown in FIG. 5, the first lens system includes, sequentially along the optical axis from the object side to the image side: a diaphragm STO, a first lens E1, a second lens E2, a third lens E3, a fourth lens E4, a fifth lens E5, a sixth lens E6, a seventh lens E7, an optical filter E8, and the image plane S17.

The first lens E1 has a positive refractive power, the object-side surface S1 thereof is a convex surface and the image-side surface S2 thereof is a concave surface. The second lens E2 has a negative refractive power, the object-side surface S3 thereof is a convex surface and the image-side surface S4 thereof is a concave surface. The third lens E3 has a positive refractive power, the object-side surface S5 thereof is a convex surface and the image-side surface S6 thereof is a convex surface. The fourth lens E4 has a negative refractive power, the object-side surface S7 thereof is a concave surface and the image-side surface S8 thereof is a concave surface. The fifth lens E5 has a positive refractive power, the object-side surface S9 thereof is a concave surface and the image-side surface S10 thereof is a convex surface. The sixth lens E6 has a positive refractive power, the object-side surface S11 thereof is a concave surface and the image-side surface S12 thereof is a convex surface. The seventh lens E7 has a negative refractive power, the object-side surface S13 thereof is a concave surface and the image-side surface S14 thereof is a convex surface. The optical filter E8 has an object-side surface S15 and an image-side surface S16. Light from the object sequentially passes through the respective surfaces S1 to S16 and is finally form an image on image plane S17. In the present embodiment, the first lens E1 to the seventh lens E7 may be plastic lenses.

Table 5 below shows a basic parameter table of the first lens system of Embodiment 3, where the radius of curvature, the thickness and the focal length are all in millimeters (mm). Table 6 below shows the high-order coefficients applicable to the aspheric surfaces in Embodiment 3. The surface type of each aspheric surface may be defined by the formula (1) given in Embodiment 1.

according to Embodiment 3, representing a curvature of the tangential image plane and a curvature of the sagittal image plane. FIG. 6C illustrates the distortion curve of the first lens system according to Embodiment 3, representing amounts of distortion at different viewing angles. FIG. 6D illustrates the lateral color curve of the first lens system according to Embodiment 3, representing deviations of different image heights on the image plane after light passing through the lens assembly. In summary, with reference to FIGS. 6A to 6D, the first lens system according to Embodiment 3 can achieve good imaging quality.

Embodiment 4

Figure 7:
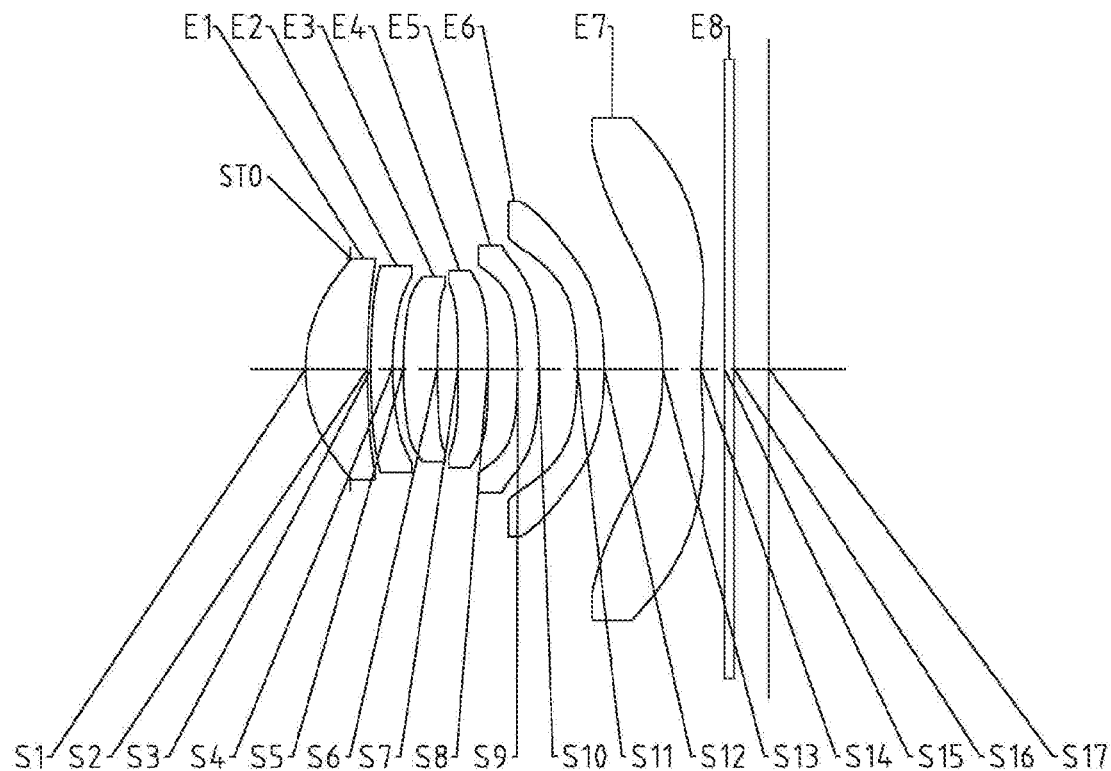
FIG. 7 is a schematic structural diagram illustrating a first lens system according to Embodiment 4.

A first lens system according to Embodiment 4 of the present disclosure is described with reference to FIGS. 7 to 8D. FIG. 7 is a schematic structural diagram illustrating the first lens system according to Embodiment 4.

As shown in FIG. 7, the first lens system includes, sequentially along the optical axis from the object side to the image side: a diaphragm STO, a first lens E1, a second lens

TABLE 5

Embodiment 3: $f_T$ = 5.35 mm, $TTL_T$ = 5.58 mm, $ImgH_T$ = 4.15 mm, Semi-$FOV_T$ = 37.5°

| surface number | surface type | radius of curvature | thickness | Attribute refractive index | abbe number | Material | focal length | conic coefficient |
|---|---|---|---|---|---|---|---|---|
| OBJ | spherical | infinite | infinite | | | | | |
| STO | spherical | infinite | −0.5193 | | | | | |
| S1 | aspheric | 1.7341 | 0.7576 | 1.547 | 56.11 | Plastic | 3.62 | −0.9079 |
| S2 | aspheric | 11.9690 | 0.0622 | | | | | 8.1954 |
| S3 | aspheric | 14.2307 | 0.2400 | 1.668 | 20.40 | Plastic | −7.97 | 8.9539 |
| S4 | aspheric | 3.8509 | 0.1379 | | | | | 0.8593 |
| S5 | aspheric | 9.5420 | 0.3687 | 1.547 | 56.11 | Plastic | 16.93 | 7.3771 |
| S6 | aspheric | −300.0000 | 0.2148 | | | | | 25.0000 |
| S7 | aspheric | −359.5294 | 0.3205 | 1.646 | 23.49 | Plastic | −77.29 | 25.0000 |
| S8 | aspheric | 58.0123 | 0.3326 | | | | | −6.6699 |
| S9 | aspheric | −5.8794 | 0.2637 | 1.668 | 20.40 | Plastic | 42.10 | −87.8536 |
| S10 | aspheric | −4.9514 | 0.4645 | | | | | −64.7339 |
| S11 | aspheric | −4.7890 | 0.3888 | 1.547 | 56.11 | Plastic | 43.06 | −34.5685 |
| S12 | aspheric | −4.0932 | 0.6565 | | | | | 1.6108 |
| S13 | aspheric | −6.1442 | 0.5575 | 1.537 | 55.74 | Plastic | −4.30 | −8.2042 |
| S14 | aspheric | 3.8132 | 0.3047 | | | | | −23.0835 |
| S15 | spherical | infinite | 0.1100 | 1.517 | 64.17 | Glass | | |
| S16 | spherical | infinite | 0.4000 | | | | | |
| S17 | spherical | infinite | | | | | | |

TABLE 6

| Surface Number | A4 | A6 | A8 | A10 | A12 | A14 | A16 | A18 | A20 |
|---|---|---|---|---|---|---|---|---|---|
| S1 | 1.8835E−02 | −6.7617E−03 | 4.1328E−02 | −1.1066E−01 | 1.7959E−01 | −1.7967E−01 | 1.0719E−01 | −3.4964E−02 | 4.7430E−03 |
| S2 | −1.8584E−02 | 7.5922E−02 | −1.2052E−01 | 1.9402E−01 | −3.0806E−01 | 3.6702E−01 | −2.7206E−01 | 1.0776E−01 | −1.7272E−02 |
| S3 | −3.2669E−02 | 1.1867E−01 | −1.4474E−01 | 1.1632E−01 | −8.9686E−02 | 1.2734E−01 | −1.4310E−01 | 7.6914E−02 | −1.5153E−02 |
| S4 | −3.0886E−02 | 1.1365E−01 | −2.8070E−01 | 8.7269E−01 | −2.0019E+00 | 3.0540E+00 | −2.7666E+00 | 1.3189E+00 | −2.5367E−01 |
| S5 | −4.9099E−03 | 9.6632E−02 | −3.1254E−01 | 1.2123E+00 | −2.7438E+00 | 3.9843E+00 | −3.4607E+00 | 1.6113E+00 | −3.0785E−01 |
| S6 | −8.5866E−03 | −6.2319E−03 | 2.0396E−01 | −6.2898E−01 | 1.3790E+00 | −1.9020E+00 | 1.6612E+00 | −8.3140E−01 | 1.8530E−01 |
| S7 | −1.1112E−01 | −8.7982E−03 | −3.1786E−03 | 1.3490E−01 | −4.0397E−01 | 5.5412E−01 | −3.3997E−01 | 4.6097E−02 | 2.4862E−02 |
| S8 | −9.0678E−02 | −9.3694E−02 | 3.7555E−01 | −1.1205E+00 | 2.1453E+00 | −2.6293E+00 | 1.9935E+00 | −8.5083E−01 | 1.5650E−01 |
| S9 | −8.5062E−02 | −1.4915E−01 | 5.0469E−01 | −1.2998E+00 | 2.1157E+00 | −2.2676E+00 | 1.5197E+00 | −5.7730E−01 | 9.5399E−02 |
| S10 | −8.8232E−02 | −1.8564E−02 | 3.9334E−02 | −7.9994E−03 | −8.1871E−02 | 1.2907E−01 | −9.3440E−02 | 3.4516E−02 | −5.1021E−03 |
| S11 | −8.9608E−02 | −5.6749E−02 | −2.5995E−02 | 1.8732E−01 | −2.9151E−01 | 2.4834E−01 | −1.2262E−01 | 3.2279E−02 | −3.4547E−03 |
| S12 | 5.8891E−03 | −1.0585E−01 | 1.2123E−01 | −9.6358E−02 | 5.7342E−02 | −2.2556E−02 | 5.3626E−03 | −6.9584E−04 | 3.7787E−05 |
| S13 | −7.1730E−02 | 2.3332E−02 | −2.6061E−03 | 2.1195E−04 | −9.1134E−05 | 2.3442E−05 | −2.7785E−06 | 1.5982E−07 | −3.6607E−09 |
| S14 | −5.5129E−02 | 2.2645E−02 | −7.5932E−03 | 1.9155E−03 | −3.5703E−04 | 4.6379E−05 | −3.8555E−06 | 1.8058E−07 | −3.5745E−09 |

Figure 6A:
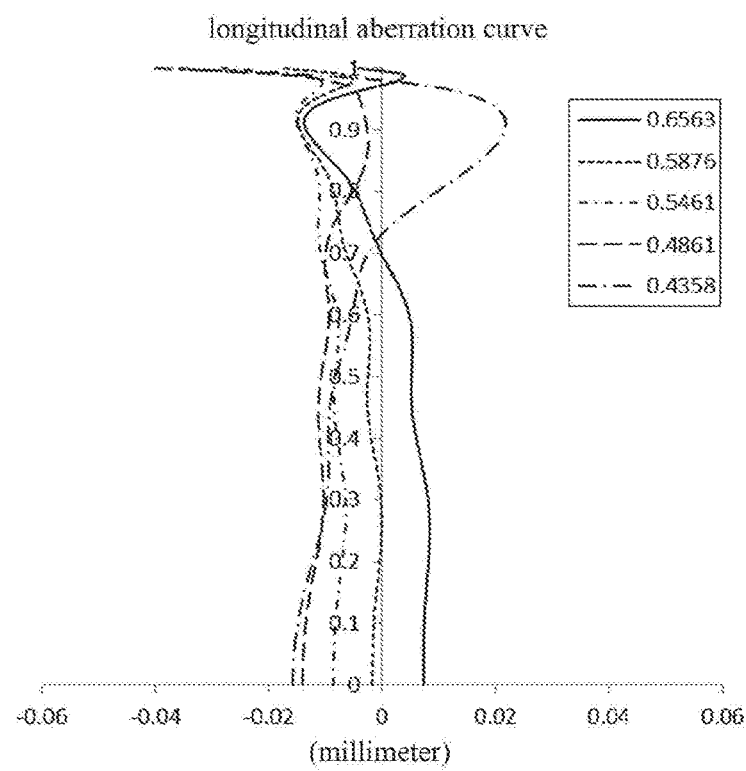
FIGS. 6A-6D respectively illustrate a longitudinal aberration curve, an astigmatic curve, a distortion curve and a lateral color curve of the first lens system according to Embodiment 3.
Figure 6B:
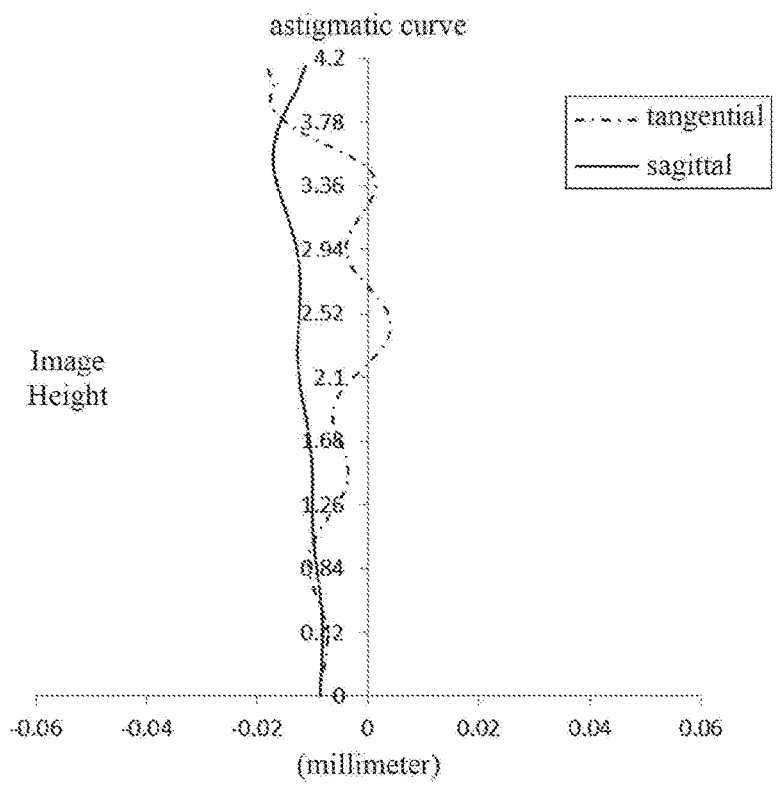
Figure 6C:
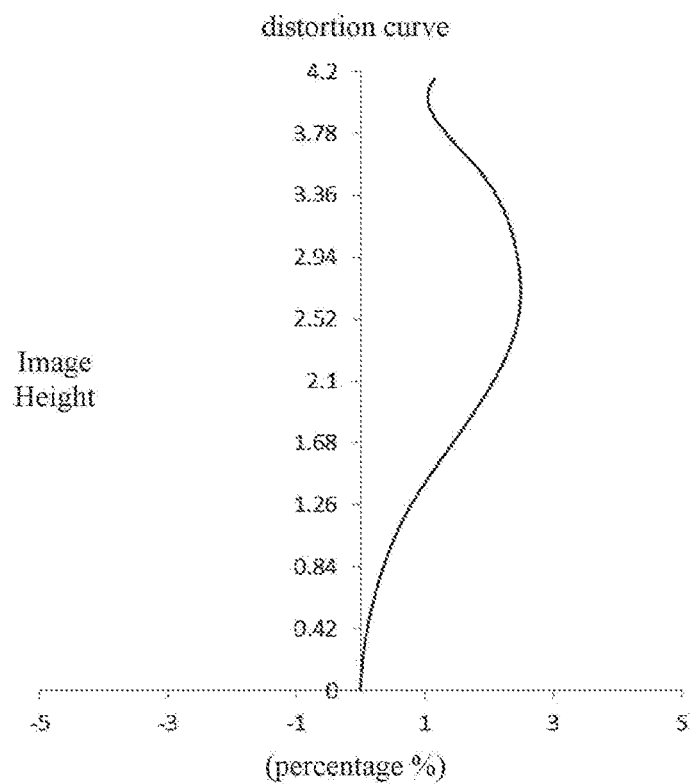
Figure 6D:
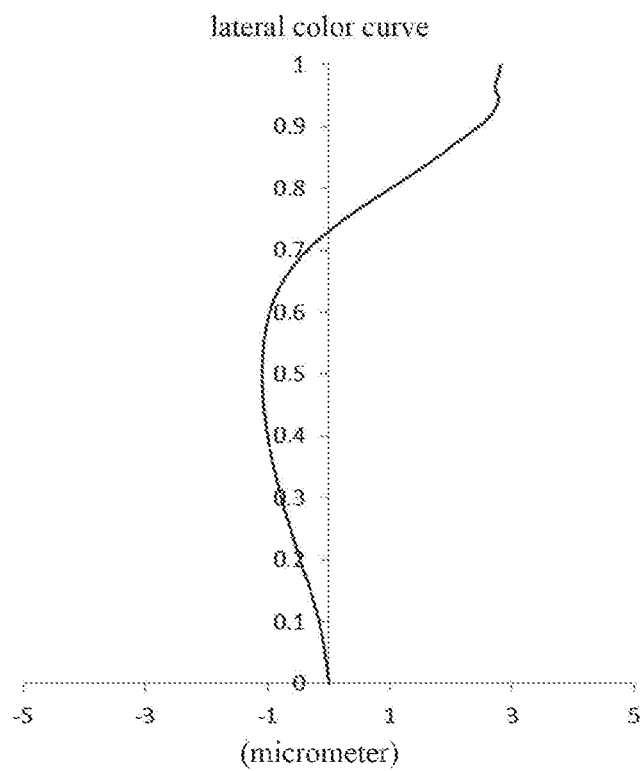

FIG. 6A illustrates the longitudinal aberration curve of the first lens system according to Embodiment 3, representing deviations of focal points converged by lights of different wavelengths after passing through the lens assembly. FIG. 6B illustrates the astigmatic curve of the first lens system E2, a third lens E3, a fourth lens E4, a fifth lens E5, a sixth lens E6, a seventh lens E7, an optical filter E8, and the image plane S17.

The first lens E1 has a positive refractive power, the object-side surface S1 thereof is a convex surface and the image-side surface S2 thereof is a concave surface. The second lens E2 has a negative refractive power, the object-side surface S3 thereof is a convex surface and the image-side surface S4 thereof is a concave surface. The third lens E3 has a positive refractive power, the object-side surface S5 thereof is a convex surface and the image-side surface S6 thereof is a concave surface. The fourth lens E4 has a positive refractive power, the object-side surface S7 thereof is a concave surface and the image-side surface S8 thereof is a convex surface. The fifth lens E5 has a positive refractive power, the object-side surface S9 thereof is a concave surface and the image-side surface S10 thereof is a convex surface. The sixth lens E6 has a positive refractive power, the object-side surface S11 thereof is a concave surface and the image-side surface S12 thereof is a convex surface. The seventh lens E7 has a negative refractive power, the object-side surface S13 thereof is a concave surface and the image-side surface S14 thereof is a concave surface. The optical filter E8 has an object-side surface S15 and an image-side surface S16. Light from the object sequentially passes through the respective surfaces S1 to S16 and is finally form an image on image plane S17. In the present embodiment, the first lens E1 to the seventh lens E7 may be plastic lenses.

Table 7 below shows a basic parameter table of the first lens system of Embodiment 4, where the radius of curvature, the thickness and the focal length are all in millimeters (mm). Table 8 below shows the high-order coefficients applicable to the aspheric surfaces in Embodiment 4. The surface type of each aspheric surface may be defined by the formula (1) given in Embodiment 1.

TABLE 7

Embodiment 4: $f_T = 5.23$ mm, $TTL_T = 5.35$ mm, $ImgH_T = 4.00$ mm, Semi-$FOV_T = 36.7°$

| surface number | surface type | radius of curvature | thickness | refractive index | abbe number | Material | focal length | conic coefficient |
|---|---|---|---|---|---|---|---|---|
| OBJ | spherical | infinite | infinite | | | | | |
| STO | spherical | infinite | −0.5208 | | | | | |
| S1 | aspheric | 1.6837 | 0.7179 | 1.547 | 56.11 | Plastic | 3.54 | −0.9101 |
| S2 | aspheric | 11.0415 | 0.0400 | | | | | 14.2580 |
| S3 | aspheric | 10.5976 | 0.2483 | 1.668 | 20.40 | Plastic | −7.47 | 17.7507 |
| S4 | aspheric | 3.3650 | 0.1258 | | | | | 1.1392 |
| S5 | aspheric | 5.2668 | 0.3919 | 1.547 | 56.11 | Plastic | 20.75 | 3.1587 |
| S6 | aspheric | 9.5765 | 0.2377 | | | | | 2.3037 |
| S7 | aspheric | −477.0000 | 0.3438 | 1.646 | 23.49 | Plastic | 127.08 | 25.0000 |
| S8 | aspheric | −70.0709 | 0.3441 | | | | | 25.0000 |
| S9 | aspheric | −8.6649 | 0.2472 | 1.668 | 20.40 | Plastic | 84.45 | −60.0718 |
| S10 | aspheric | −7.5984 | 0.4431 | | | | | −72.0306 |
| S11 | aspheric | −4.9628 | 0.3128 | 1.547 | 56.11 | Plastic | 22.05 | −44.6946 |
| S12 | aspheric | −3.5931 | 0.6748 | | | | | 1.4755 |
| S13 | aspheric | −3.6150 | 0.4394 | 1.537 | 55.74 | Plastic | −3.75 | −7.1405 |
| S14 | aspheric | 4.7400 | 0.2737 | | | | | −61.7230 |
| S15 | spherical | infinite | 0.1100 | 1.517 | 64.17 | Glass | | |
| S16 | spherical | infinite | 0.4000 | | | | | |
| S17 | spherical | infinite | | | | | | |

TABLE 8

| Surface Number | A4 | A6 | A8 | A10 | A12 | A14 | A16 | A18 | A20 |
|---|---|---|---|---|---|---|---|---|---|
| S1 | 1.8869E−02 | −3.1379E−03 | 4.5685E−02 | −1.5786E−01 | 2.9471E−01 | −3.1988E−01 | 2.0012E−01 | −6.6982E−02 | 9.2292E−03 |
| S2 | −4.6314E−02 | 2.5994E−01 | −7.0561E−01 | 1.3969E+00 | −1.9939E+00 | 1.9020E+00 | −1.1129E+00 | 3.5523E−01 | −4.7035E−02 |
| S3 | −5.6917E−02 | 2.9214E−01 | −7.0069E−01 | 1.2416E+00 | −1.6706E+00 | 1.5983E+00 | −9.6869E−01 | 3.2375E−01 | −4.4886E−02 |
| S4 | −4.4586E−02 | 2.1174E−01 | −5.9354E−01 | 1.5125E+00 | −2.8936E+00 | 3.8219E+00 | −3.1016E+00 | 1.3562E+00 | −2.4274E−01 |
| S5 | −2.4836E−02 | 1.7572E−01 | −5.3748E−01 | 1.7808E+00 | −3.8292E+00 | 5.3206E+00 | −4.4540E+00 | 2.0196E+00 | −3.7915E−01 |
| S6 | −1.3124E−02 | −2.6043E−02 | 4.6846E−01 | −1.7585E+00 | 4.2742E+00 | −6.5202E+00 | 6.1367E+00 | −3.2375E+00 | 7.3786E−01 |
| S7 | −1.1269E−01 | 5.1747E−02 | −2.9189E−01 | 1.1382E+00 | −2.7388E+00 | 4.0175E+00 | −3.4652E+00 | 1.6008E+00 | −3.0160E−01 |
| S8 | −1.0396E−01 | −2.0984E−02 | 1.5699E−01 | −6.7539E−01 | 1.5526E+00 | −2.1469E+00 | 1.7808E+00 | −8.1617E−01 | 1.5891E−01 |
| S9 | −6.6384E−02 | −3.3166E−01 | 1.3587E+00 | −3.8377E+00 | 6.7036E+00 | −7.3652E+00 | 4.9086E+00 | −1.8111E+00 | 2.8466E−01 |
| S10 | −6.0282E−02 | −1.3445E−01 | 3.8963E−01 | −7.6593E−01 | 9.5266E−01 | −7.4506E−01 | 3.4830E−01 | −8.6993E−02 | 8.8239E−03 |
| S11 | −9.3076E−02 | −4.0807E−02 | −9.8316E−02 | 2.9418E−01 | −4.0076E−01 | 3.3453E−01 | −1.6951E−01 | 4.6842E−02 | −5.3242E−03 |
| S12 | 2.6201E−02 | −1.3260E−01 | 1.2754E−01 | −9.6843E−02 | 6.2621E−02 | −2.7441E−02 | 7.2169E−03 | −1.0306E−03 | 6.1579E−05 |
| S13 | −6.8813E−02 | 1.1862E−02 | 8.0183E−03 | −4.4015E−03 | 1.0536E−03 | −1.5081E−04 | 1.3587E−05 | −7.2367E−07 | 1.7525E−08 |
| S14 | −4.8631E−02 | 8.4969E−03 | 1.7151E−03 | −1.5069E−03 | 4.1274E−04 | −6.1412E−05 | 5.2674E−06 | −2.4420E−07 | 4.7399E−09 |

Figure 8A:
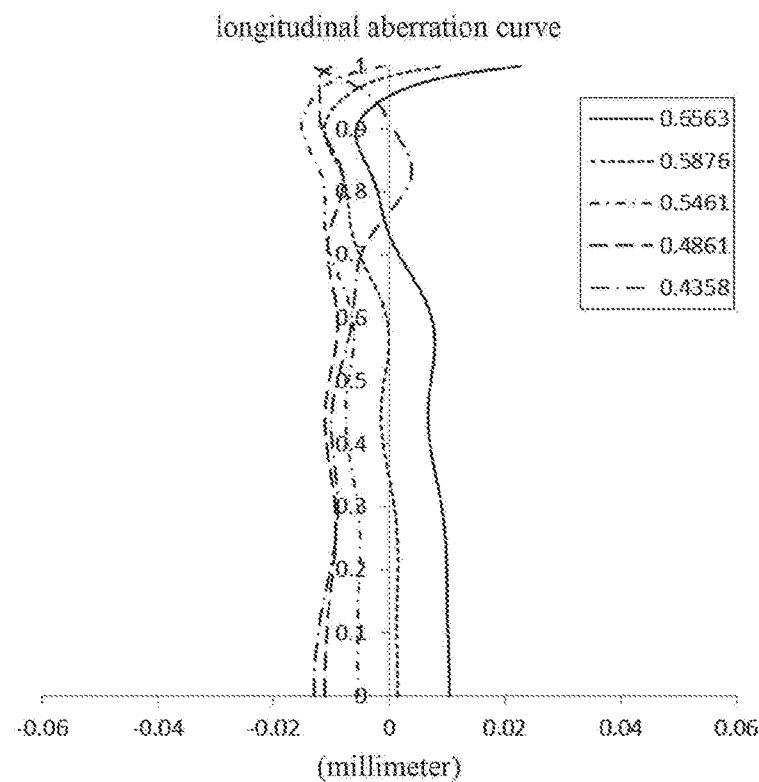
FIGS. 8A-8D respectively illustrate a longitudinal aberration curve, an astigmatic curve, a distortion curve and a lateral color curve of the first lens system according to Embodiment 4.
Figure 8B:
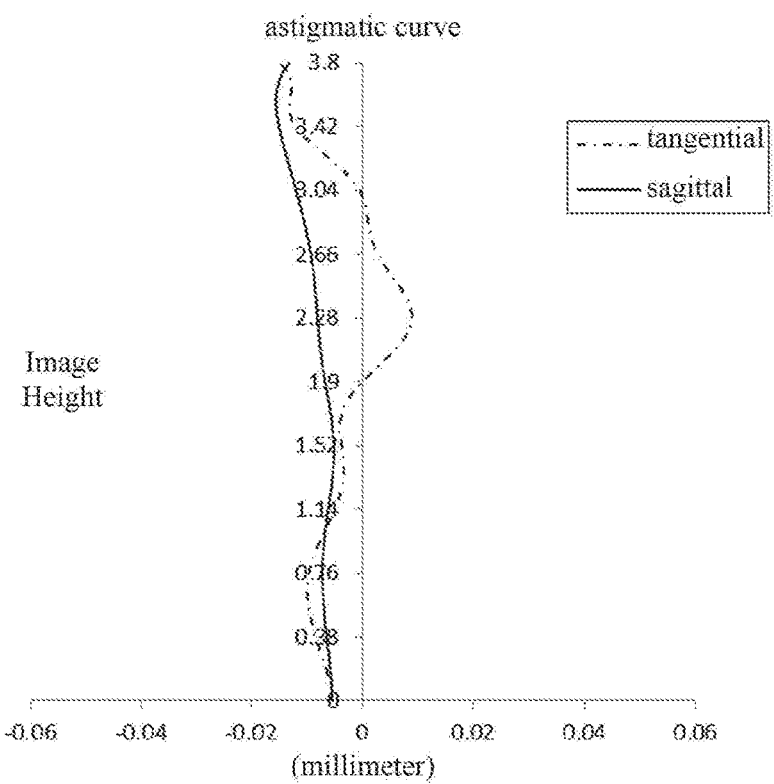
Figure 8C:
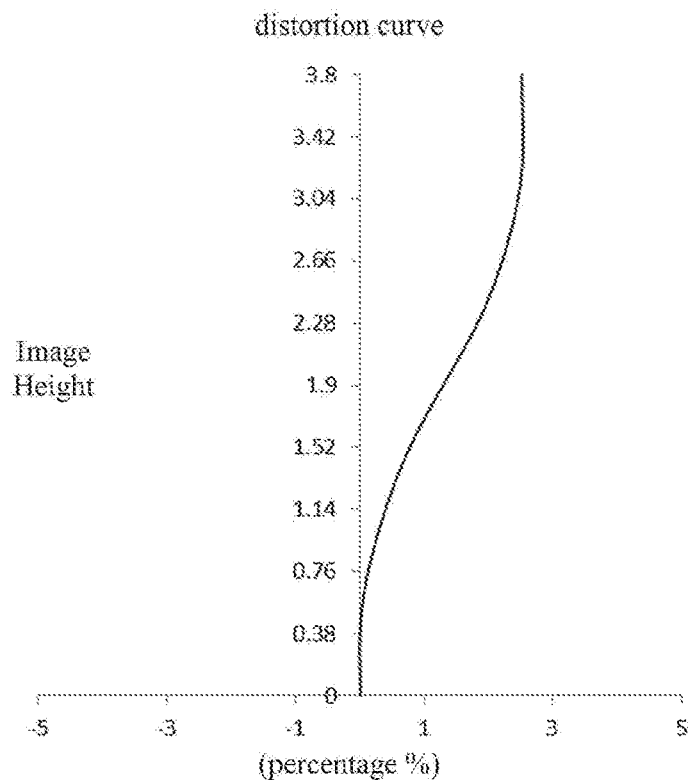
Figure 8D:
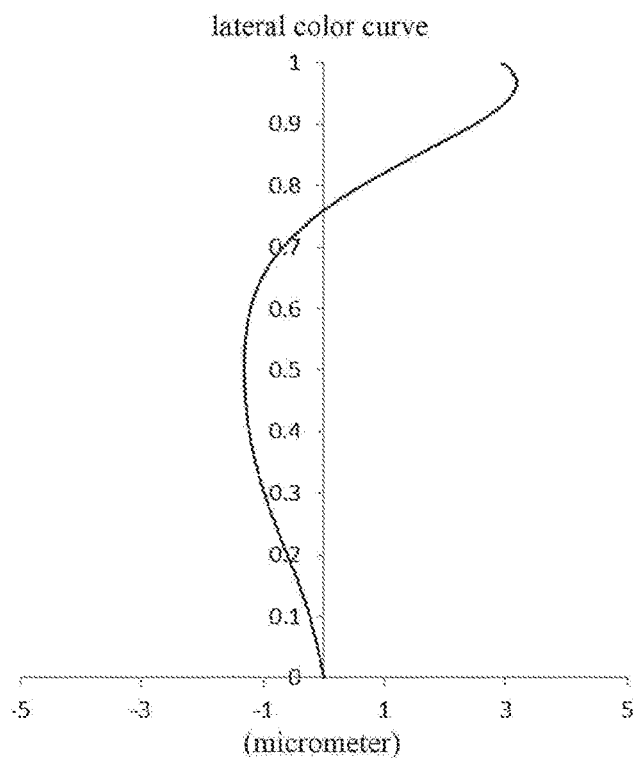

FIG. 8A illustrates the longitudinal aberration curve of the first lens system according to Embodiment 4, representing deviations of focal points converged by lights of different wavelengths after passing through the lens assembly. FIG. 8B illustrates the astigmatic curve of the first lens system according to Embodiment 4, representing a curvature of the tangential image plane and a curvature of the sagittal image plane. FIG. 8C illustrates the distortion curve of the first lens system according to Embodiment 4, representing amounts of distortion at different viewing angles. FIG. 8D illustrates the lateral color curve of the first lens system according to Embodiment 4, representing deviations of different image heights on the image plane after light passing through the lens assembly. In summary, with reference to FIGS. 8A to 8D, the first lens system according to Embodiment 4 can achieve good imaging quality.

(II) The Second Lens System

The second lens system according to the present disclosure may include, for example, seven lenses having refractive powers, specifically, a first lens, a second lens, a third lens, a fourth lens, a fifth lens, a sixth lens, and a seventh lens. The seven lenses are sequentially arranged along the optical axis of the first lens system from the object side to the image side. The object-side surface of the first lens of the second lens system may be a concave surface and the image-side surface of the first lens of the second lens system may be a convex surface; the third lens may have a positive refractive power; the fourth lens may have a negative refractive power; the fifth lens may have a positive refractive power.

In an exemplary implementation, the second lens of the second lens system may have a positive refractive power.

In an exemplary implementation, the image-side surface of the fifth lens of the second lens system may be convex.

In an exemplary implementation, the image-side surface of the third lens of the second lens system may be a convex surface, and the seventh lens of the second lens system may have a negative refractive power, the object-side surface of the seventh lens of the second lens system may be a concave surface. By making the image-side surface of the third lens of the second lens system convex and the seventh lens having a negative refractive power and the object-side surface thereof concave, the aberration at the edge field of view can be effectively reduced while the amount of light flus increased; at the same time, the third lens is set to have a positive refractive power, which facilitates distribution of refractive powers in the entire second lens system, and avoids excessive concentration of refractive powers, and also conducive to the second lens system to balance the axial chromatic aberration and the lateral chromatic aberration.

In an exemplary implementation, the electronic imaging apparatus of the present disclosure may satisfy the conditional expression $0.1<f5_W/(f2_W+f3_W)<0.5$, where $f5_W$ is the effective focal length of the fifth lens of the second lens system, $f2_W$ is the effective focal length of the second lens of the second lens system, and $f3_W$ is the effective focal length of the third lens of the second lens system. More specifically, $f5_W$, $f2_W$ and $f3_W$ may further satisfy $0.19 \leq f5_W/(f2_W+f3_W) \leq 0.35$. By satisfying the conditional expression $0.1<f5_W/(f2_W+f3_W)<0.5$, the size of the second lens system can be effectively reduced, the aberration of the second lens system can be further effectively reduced, the sensitivity of the second lens system can be reduced, and excessive concentration of the refractive powers of the second lens system can be avoided, so that the second lens system can be better processing characteristic.

In an exemplary implementation, the electronic imaging apparatus of the present disclosure may satisfy the conditional expression $0.4<(R7_W+R8_W)/f4_W<0.9$, where $R7_W$ is the radius of curvature of the object-side surface of the fourth lens of the second lens system, $R8_W$ is the radius of curvature of the image-side surface of the fourth lens of the second lens system, and $f4_W$ is the effective focal length of the fourth lens of the second lens system. More specifically, $R7_W$, $R8_W$ and $f4_W$ may further satisfy $0.48 \leq (R7_W+R8_W)/f4_W \leq 0.89$. By satisfying the conditional expression $0.4<(R7_W+R8_W)/f4_W<0.9$, it is possible to control the contributions of the object-side surface and the image-side surface of the fourth lens to the field curvature within a reasonable range, thereby effectively balancing the amount of curvature of filed generated by the rear group of lenses, thereby enabling the second lens system to have a good capability of correcting the chromatic aberration and facilitating the second lens system to maintain its ultra-thin characteristics. Alternatively, the object-side surface of the fourth lens of the second lens system may be concave and the image-side surface of the fourth lens of the second lens system may be convex.

In an exemplary implementation, the electronic imaging apparatus of the present disclosure may satisfy the conditional expression $0.8<(R3_W+R4_W)/(R11_W+R12_W)<1.3$, where $R3_W$ is the radius of curvature of the object-side surface of the second lens of the second lens system, $R4_W$ is the radius of curvature of the image-side surface of the second lens of the second lens system, $R11_W$ is the radius of curvature of the object-side surface of the sixth lens of the second lens system, and $R12_W$ is the radius of curvature of the image-side surface of the sixth lens of the second lens system. More specifically, $R3_W$, $R4_W$, $R11_W$ and $R12_W$ may further satisfy $0.92 \leq (R3_W+R4_W)/(R11_W+R12_W) \leq 1.19$. By satisfying the conditional expression $0.8<(R3_W+R4_W)/(R11_W+R12_W)<1.3$, it ensures that the second lens and the sixth lens have a better light converging effect, which is conducive to improving the relative light intensity of the second lens system and also improving the relative illumination of the second lens system; at the same time, the second lens and the sixth lens of the second lens system can be kept in good processing characteristic, thereby improving the practicality of the second lens system. Alternatively, the object-side surface of the second lens of the second lens system may be convex and the image-side surface of the second lens of the second lens system may be concave; the object-side surface of the sixth lens of the second lens system may be convex, and the image-side surface of the sixth lens of the second lens system may be concave.

In an exemplary implementation, the second lens system described above may further include at least one diaphragm. The diaphragm may be provided in an appropriate position as desired, for example between the first lens and the second lens. Alternatively, the second lens system described above may further include an optical filter for correcting color deviations and/or a protective glass for protecting the photosensitive element located on the image plane.

In the implementations of the present disclosure, at least one of the surfaces of each lens in the second lens system is an aspheric surface, for example, at least one of the object-side surface and the image-side surface of each lens of the first lens, the second lens, the third lens, the fourth lens, the fifth lens, the sixth lens, and the seventh lens is an aspheric mirror surface. Alternatively, the object-side surface and the image-side surface of each of the first lens, the second lens, the third lens, the fourth lens, the fifth lens, the sixth lens, and the seventh lens of the second lens system are aspherical surfaces.

Various embodiments of the second lens system according to the present disclosure will be further described below with reference to FIGS. 9 to 16D.

Figure 9:
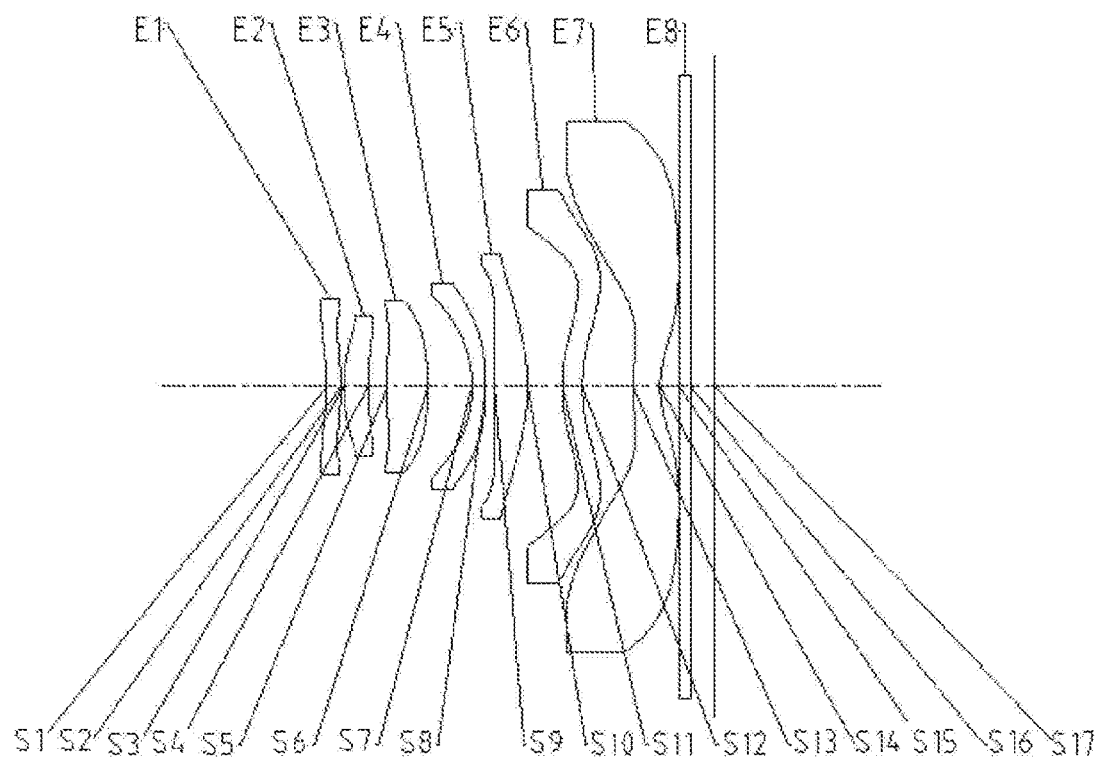
FIG. 9 is a schematic structural diagram illustrating a second lens system according to Embodiment 5.

As shown in FIG. 9, the second lens system includes, sequentially along the optical axis from the object side to the image side: a first lens E1, a second lens E2, a third lens E3, a fourth lens E4, a fifth lens E5, a sixth lens E6, a seventh lens E7, an optical filter E8, and an image plane S17.

The first lens E1 has a negative refractive power, the object-side surface S1 thereof is a concave surface and the image-side surface S2 thereof is a convex surface. The second lens E2 has a positive refractive power, the object-side surface S3 thereof is a convex surface and the image-side surface S4 thereof is a concave surface. The third lens E3 has a positive refractive power, the object-side surface S5 thereof is a convex surface and the image-side surface S6 thereof is a convex surface. The fourth lens E4 has a negative refractive power, the object-side surface S7 thereof is a concave surface and the image-side surface S8 thereof is a convex surface. The fifth lens E5 has a positive refractive power, the object-side surface S9 thereof is a convex surface and the image-side surface S10 thereof is a convex surface. The sixth lens E6 has a negative refractive power, the object-side surface S11 thereof is a convex surface and the image-side surface S12 thereof is a concave surface. The seventh lens E7 has a negative refractive power, the object-side surface S13 thereof is a convex surface and the image-side surface S14 thereof is a concave surface. The optical filter E8 has an object-side surface S15 and an image-side surface S16. Light from an object sequentially passes through the respective surfaces S1 to S16 and is finally form an image on image plane S17. In the present embodiment, the first lens E1 to the seventh lens E7 may be plastic lenses.

Although not shown, a diaphragm may be provided between the first lens E1 and the second lens E2 to further improve the imaging quality of the lens.

Table 9 below shows a basic parameter table of the second lens system of Embodiment 5, where the radius of curvature, the thickness and the focal length are all in millimeters (mm). Table 10 below shows the high-order coefficients applicable to the aspheric surfaces in Embodiment 5. The surface type of each aspheric surface may be defined by the formula (1) given in Embodiment 1.

TABLE 9

Embodiment 5: $f_W$ = 4.82 mm, $TTL_W$ = 6.98 mm, $ImgH_W$ = 5.95 mm, Semi-$FOV_W$ = 51.2°

| surface number | surface type | radius of curvature | thickness | refractive index | abbe number | Material | focal length | conic coefficient |
|---|---|---|---|---|---|---|---|---|
| OBJ | spherical | infinite | infinite | | | | | |
| S1 | aspheric | −3.8295 | 0.2500 | 1.67 | 20.4 | Plastic | −45.38 | −32.7516 |
| S2 | aspheric | −4.4991 | 0.2500 | | | | | −55.5418 |
| STO | spherical | infinite | −0.1949 | | | | | 0.0000 |
| S3 | aspheric | 2.7512 | 0.4353 | 1.55 | 56.1 | Plastic | 11.78 | −0.8898 |
| S4 | aspheric | 4.5380 | 0.3513 | | | | | −17.9024 |
| S5 | aspheric | 14.6027 | 0.7345 | 1.54 | 55.9 | Plastic | 6.54 | −28.3715 |
| S6 | aspheric | −4.5375 | 0.7875 | | | | | 4.4902 |
| S7 | aspheric | −2.2411 | 0.2504 | 1.68 | 19.2 | Plastic | −7.30 | 0.0964 |
| S8 | aspheric | −4.2836 | 0.1550 | | | | | −0.0737 |
| S9 | aspheric | 53.3738 | 0.6000 | 1.55 | 56.1 | Plastic | 5.76 | 2.4573 |
| S10 | aspheric | −3.3286 | 0.6096 | | | | | −0.8655 |
| S11 | aspheric | 3.4856 | 0.3587 | 1.67 | 20.4 | Plastic | −752.79 | −2.6932 |
| S12 | aspheric | 3.3191 | 0.9150 | | | | | −0.4005 |
| S13 | aspheric | 3.8182 | 0.4800 | 1.55 | 56.1 | Plastic | −6.15 | −0.4655 |
| S14 | aspheric | 1.7078 | 0.3494 | | | | | −1.1194 |
| S15 | spherical | infinite | 0.2100 | 1.52 | 64.2 | Glass | | |
| S16 | spherical | infinite | 0.4336 | | | | | |
| S17 | spherical | infinite | | | | | | |

Where $f_W$ is the total effective focal length of the second lens system, $TTL_W$ is the distance on the optical axis of the second lens system from the object-side surface S1 of the first lens E1 of the second lens system to the image plane S17 of the second lens system, $ImgH_T$ is half of the diagonal length of the effective pixel area on the image plane S17 of the second lens system, and Semi-$FOV_T$ is half of the maximal field of view of the second lens system.

TABLE 10

| Surface Number | A4 | A6 | A8 | A10 | A12 | A14 | A16 | A18 | A20 |
|---|---|---|---|---|---|---|---|---|---|
| S1 | −7.1500E−03 | 3.8157E−02 | −3.7120E−02 | 2.7936E−02 | −1.5540E−02 | 5.8100E−03 | −1.3700E−03 | 1.8400E−04 | −1.1000E−05 |
| S2 | −1.3330E−02 | 8.3411E−02 | −1.1078E−01 | 1.1283E−01 | −8.1560E−02 | 3.9402E−02 | −1.2080E−02 | 2.1090E−03 | −1.6000E−04 |
| S3 | −3.2550E−02 | 4.7258E−02 | −8.4570E−02 | 1.1522E−01 | −1.1082E−01 | 6.9209E−02 | −2.6800E−02 | 5.8050E−03 | −5.5000E−04 |
| S4 | −1.9910E−02 | 7.5080E−03 | −8.2100E−03 | 2.6740E−03 | 2.2100E−04 | −9.3000E−04 | 5.1300E−04 | −1.4000E−04 | 1.7400E−05 |
| S5 | −8.3700E−03 | −1.3160E−02 | 2.2787E−02 | −4.0810E−02 | 4.2087E−02 | −2.6520E−02 | 1.0013E−02 | −2.0400E−03 | 1.7200E−04 |
| S6 | −6.1900E−03 | −6.5400E−03 | 6.3860E−03 | −1.1750E−02 | 1.1662E−02 | −7.1500E−03 | 2.6720E−03 | −5.6000E−04 | 4.8800E−05 |
| S7 | −2.6000E−04 | −6.1000E−03 | 1.2890E−03 | 1.2776E−02 | −2.3450E−02 | 1.8574E−02 | −7.5300E−03 | 1.5360E−03 | −1.2000E−04 |
| S8 | −1.6590E−02 | −1.7420E−02 | 2.5839E−02 | −2.0640E−02 | 9.0080E−03 | −1.9900E−03 | 1.7600E−04 | 0.0000E+00 | 0.0000E+00 |
| S9 | 6.1200E−03 | −1.4510E−02 | 1.0993E−02 | −5.4500E−03 | 1.4610E−03 | −2.1000E−04 | v1.7200E−05 | −1.5000E−06 | 1.0300E−07 |
| S10 | 3.5066E−02 | −1.7350E−02 | 4.9340E−03 | 1.9430E−03 | −2.2700E−03 | 8.3000E−04 | −1.5000E−04 | 1.3500E−05 | −4.8000E−07 |
| S11 | 3.3975E−02 | −3.8940E−02 | 1.5805E−02 | −4.7900E−03 | 1.1750E−03 | −2.2000E−04 | 2.7400E−05 | −1.9000E−06 | 5.2000E−08 |
| S12 | 2.5975E−02 | −3.7120E−02 | 1.3214E−02 | −2.7300E−03 | 3.4700E−04 | −2.7000E−05 | 1.2500E−06 | −3.2000E−08 | 3.4200E−10 |
| S13 | −9.9570E−02 | 5.6760E−03 | 4.3000E−03 | −1.2100E−03 | 1.5500E−04 | −1.1000E−05 | 4.8500E−07 | −1.1000E−08 | 1.1400E−10 |
| S14 | −1.0338E−01 | 2.1982E−02 | −2.9000E−03 | 2.5200E−04 | −1.5000E−05 | 5.6200E−07 | −1.4000E−08 | 1.9600E−10 | −1.2000E−12 |

Figure 10A:
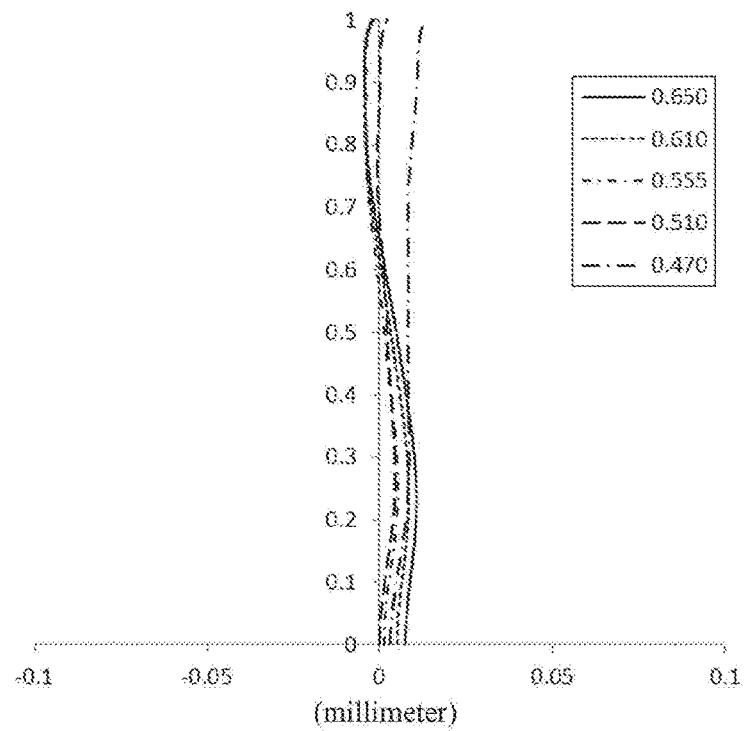
FIGS. 10A-10D respectively illustrate a longitudinal aberration curve, an astigmatic curve, a distortion curve and a lateral color curve of the second lens system according to Embodiment 5.
Figure 10B:
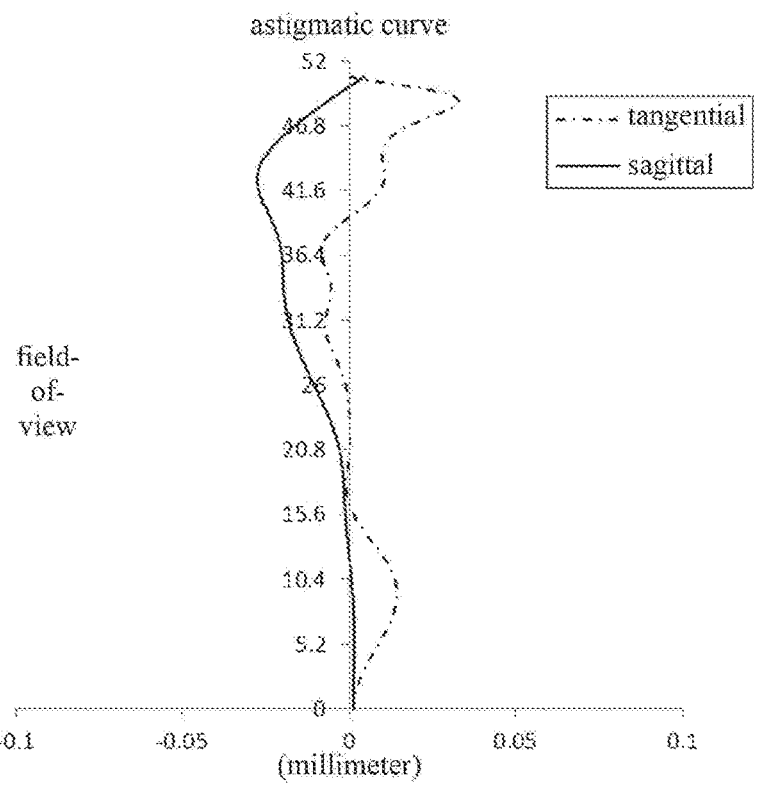
Figure 10C:
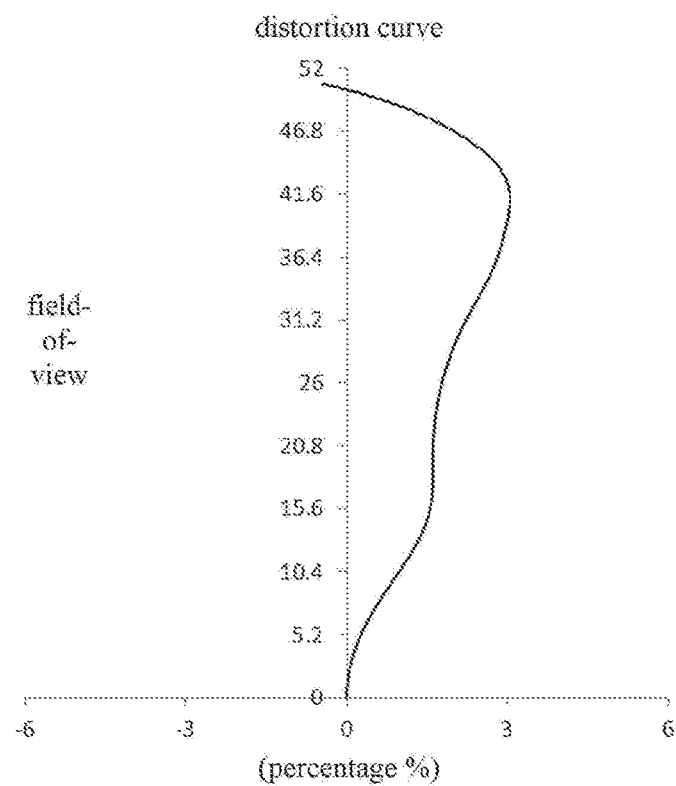
Figure 10D:
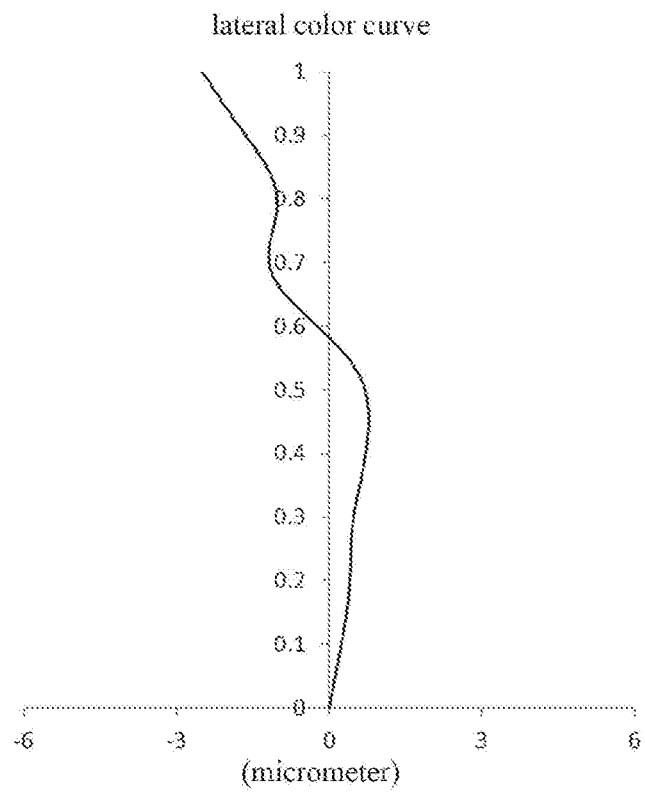

FIG. 10A illustrates the longitudinal aberration curve of the second lens system according to Embodiment 5, representing deviations of focal points converged by lights of different wavelengths after passing through the lens assembly. FIG. 10B illustrates the astigmatic curve of the second lens system according to Embodiment 5, representing a curvature of the tangential image plane and a curvature of the sagittal image plane. FIG. 10C illustrates the distortion curve of the second lens system according to Embodiment 5, representing amounts of distortion at different viewing angles. FIG. 10D illustrates the lateral color curve of the second lens system according to Embodiment 5, representing deviations of different image heights on the image plane after light passing through the lens assembly. In summary, with reference to FIGS. 10A to 10D, the second lens system according to Embodiment 5 can achieve good imaging quality.

Embodiment 6

Figure 11:
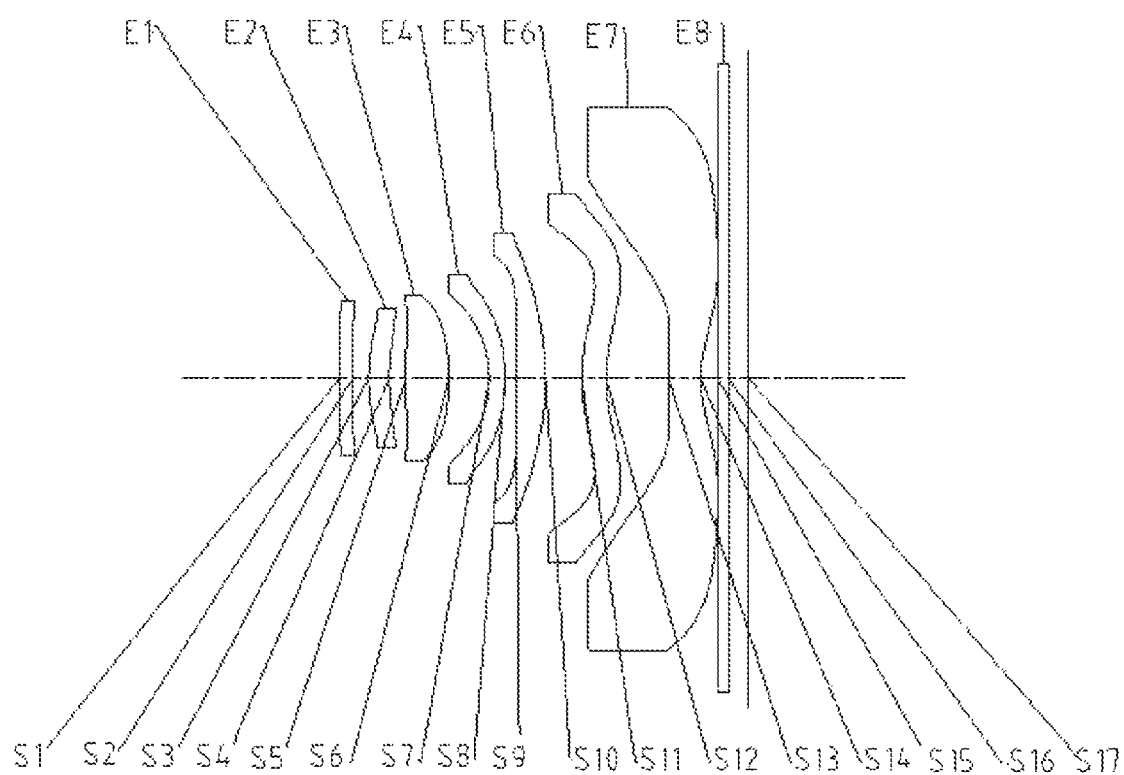
FIG. 11 is a schematic structural diagram illustrating a second lens system according to Embodiment 6.

A second lens system according to Embodiment 6 of the present disclosure is described with reference to FIGS. 11 to 12D. FIG. 11 is a schematic structural diagram illustrating the second lens system according to Embodiment 6.

As shown in FIG. 11, the second lens system includes, sequentially along the optical axis from the object side to the image side: a first lens E1, a second lens E2, a third lens E3, a fourth lens E4, a fifth lens E5, a sixth lens E6, a seventh lens E7, an optical filter E8, and an image plane S17.

The first lens E1 has a positive refractive power, the object-side surface S1 thereof is a concave surface and the image-side surface S2 thereof is a convex surface. The second lens E2 has a positive refractive power, the object-side surface S3 thereof is a convex surface and the image-side surface S4 thereof is a concave surface. The third lens E3 has a positive refractive power, the object-side surface S5 thereof is a convex surface and the image-side surface S6 thereof is a convex surface. The fourth lens E4 has a negative refractive power, the object-side surface S7 thereof is a concave surface and the image-side surface S8 thereof is a convex surface. The fifth lens E5 has a positive refractive power, the object-side surface S9 thereof is a convex surface and the image-side surface S10 thereof is a convex surface. The sixth lens E6 has a positive refractive power, the object-side surface S11 thereof is a convex surface and the image-side surface S12 thereof is a concave surface. The seventh lens E7 has a negative refractive power, the object-side surface S13 thereof is a convex surface and the image-side surface S14 thereof is a concave surface. The optical filter E8 has an object-side surface S15 and an image-side surface S16. Light from the object sequentially passes through the respective surfaces S1 to S16 and is finally form an image on image plane S17. In the present embodiment, the first lens E1 to the seventh lens E7 may be plastic lenses.

Although not shown, a diaphragm may be provided between the first lens E1 and the second lens E2 to further improve the imaging quality of the lens.

Table 11 below shows a basic parameter table of the second lens system of Embodiment 6, where the radius of curvature, the thickness and the focal length are all in millimeters (mm). Table 12 below shows the high-order coefficients applicable to the aspheric surfaces in Embodiment 6. The surface type of each aspheric surface may be defined by the formula (1) given in Embodiment 1.

TABLE 11

Embodiment 6: $f_W$ = 5.38 mm, $TTL_W$ = 7.88 mm, $ImgH_W$ = 6.30 mm, Semi-$FOV_W$ = 49.7°

| surface number | surface type | radius of curvature | thickness | refractive index | abbe number | Material | focal length | conic coefficient |
|---|---|---|---|---|---|---|---|---|
| OBJ | spherical | infinite | infinite | | | | | |
| S1 | aspheric | −44.7930 | 0.2593 | 1.67 | 20.4 | Plastic | 457.59 | −80.0000 |
| S2 | aspheric | −39.2302 | 0.2992 | | | | | −80.0000 |
| STO | spherical | infinite | 0.0050 | | | | | 0.0000 |
| S3 | aspheric | 3.3340 | 0.3979 | 1.55 | 56.1 | Plastic | 33.26 | −1.1504 |
| S4 | aspheric | 3.9117 | 0.3129 | | | | | −12.7035 |
| S5 | aspheric | 9.5285 | 0.8357 | 1.54 | 55.9 | Plastic | 5.69 | −8.9854 |
| S6 | aspheric | −4.3550 | 0.7742 | | | | | 4.2446 |
| S7 | aspheric | −2.1591 | 0.3023 | 1.68 | 19.2 | Plastic | −7.82 | 0.0996 |
| S8 | aspheric | −3.8501 | 0.2104 | | | | | 0.3099 |
| S9 | aspheric | 54.8032 | 0.5698 | 1.55 | 56.1 | Plastic | 7.52 | 2.4573 |
| S10 | aspheric | −4.4203 | 0.6964 | | | | | −0.0300 |
| S11 | aspheric | 3.6960 | 0.4719 | 1.67 | 20.4 | Plastic | 537.86 | −3.9355 |
| S12 | aspheric | 3.5439 | 1.1931 | | | | | −0.3396 |
| S13 | aspheric | 5.5741 | 0.6200 | 1.55 | 56.1 | Plastic | −7.42 | −0.4073 |
| S14 | aspheric | 2.2534 | 0.3297 | | | | | −1.0710 |
| S15 | spherical | infinite | 0.2100 | 1.52 | 64.2 | Glass | | |
| S16 | spherical | infinite | 0.3875 | | | | | |
| S17 | spherical | infinite | | | | | | |

TABLE 12

| Surface Number | A4 | A6 | A8 | A10 | A12 | A14 | A16 | A18 | A20 |
|---|---|---|---|---|---|---|---|---|---|
| S1 | 9.3630E−03 | 3.1610E−03 | 1.0227E−02 | −1.7640E−02 | 1.3945E−02 | −6.3000E−03 | 1.6200E−03 | −2.2000E−04 | 1.2046E−05 |
| S2 | 9.6670E−03 | 1.7873E−02 | −5.5200E−03 | −6.1200E−03 | 8.9995E−03 | −5.0300E−03 | 1.2470E−03 | −1.0000E−04 | −2.7334E−06 |
| S3 | −3.3280E−02 | 4.7216E−02 | −8.4700E−02 | 1.1570E−01 | −1.1083E−01 | 6.9209E−02 | −2.6800E−02 | 5.8050E−03 | −5.5310E−04 |

TABLE 12-continued

| Surface Number | A4 | A6 | A8 | A10 | A12 | A14 | A16 | A18 | A20 |
|---|---|---|---|---|---|---|---|---|---|
| S4 | −1.8650E−02 | 7.5770E−03 | −7.7800E−03 | 3.0830E−03 | 1.5001E−04 | −9.3000E−04 | 5.1300E−04 | −1.4000E−04 | 1.7366E−05 |
| S5 | −1.6260E−02 | −1.7900E−03 | −9.0100E−03 | 2.2774E−02 | −2.8657E−02 | 1.9548E−02 | −7.3300E−03 | 1.4210E−03 | −1.1058E−04 |
| S6 | −8.5100E−03 | −1.0700E−02 | 1.5760E−02 | −2.3670E−02 | 2.2976E−02 | −1.3970E−02 | 5.0820E−03 | −1.0000E−03 | 8.1608E−05 |
| S7 | −9.9100E−03 | 6.1010E−03 | −8.1500E−03 | 5.4960E−03 | −2.3768E−03 | 1.4860E−03 | −8.2000E−04 | 2.3600E−04 | −2.4901E−05 |
| S8 | −2.3270E−02 | 6.2100E−04 | 2.1270E−03 | −1.7700E−03 | 8.6300E−04 | −2.2570E−04 | 2.4848E−05 | 0.0000E+00 | 0.0000E+00 |
| S9 | 1.0713E−02 | −2.3170E−02 | 1.5976E−02 | −6.4400E−03 | 1.5153E−03 | −2.0000E−04 | 1.3200E−05 | −2.6000E−09 | −3.5073E−08 |
| S10 | 3.6562E−02 | −2.7560E−02 | 1.3286E−02 | −3.3900E−03 | 3.1625E−04 | 4.2400E−05 | −1.4000E−05 | 1.2700E−06 | −4.1883E−08 |
| S11 | 9.4900E−03 | −1.7830E−02 | 7.1580E−03 | −2.0500E−03 | 4.2730E−04 | −6.5000E−05 | 6.6500E−06 | −3.8000E−07 | 8.9813E−09 |
| S12 | −9.9400E−03 | −8.5600E−03 | 3.0040E−03 | −5.8000E−04 | 6.3709E−05 | −3.9000E−06 | 1.2500E−07 | −1.6000E−09 | −2.4189E−12 |
| S13 | −7.7310E−02 | 6.9040E−03 | 1.6020E−03 | −5.2000E−04 | 6.7285E−05 | −4.9000E−06 | 2.0900E−07 | −4.9000E−09 | 4.9026E−11 |
| S14 | −6.4280E−02 | 1.1511E−02 | −1.4100E−03 | 1.2000E−04 | −7.0472E−06 | 2.7400E−07 | −6.7000E−09 | 9.2400E−11 | −5.4953E−13 |

Figure 12A:
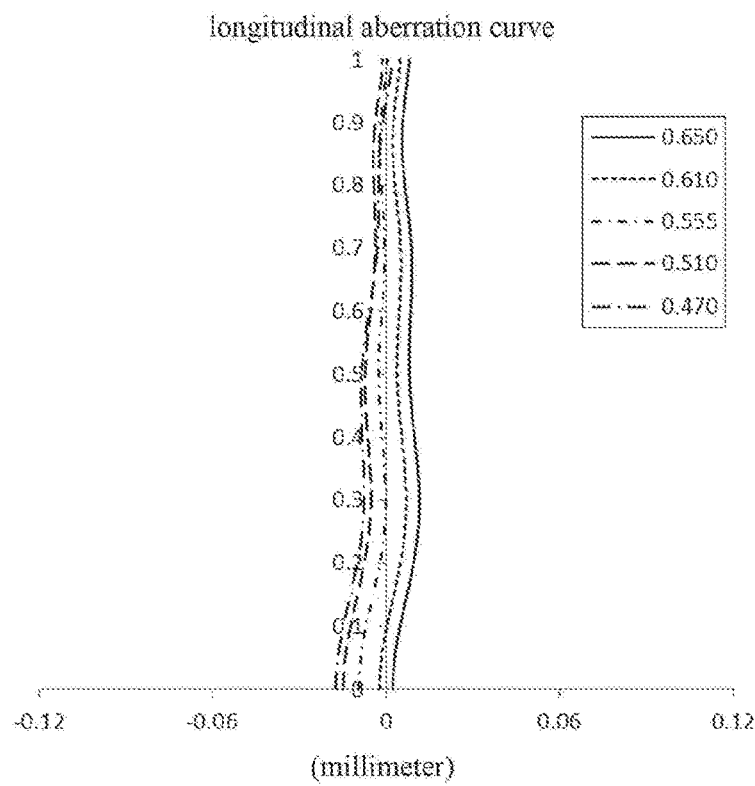
FIGS. 12A-12D respectively illustrate a longitudinal aberration curve, an astigmatic curve, a distortion curve and a lateral color curve of the second lens system according to Embodiment 6.
Figure 12B:
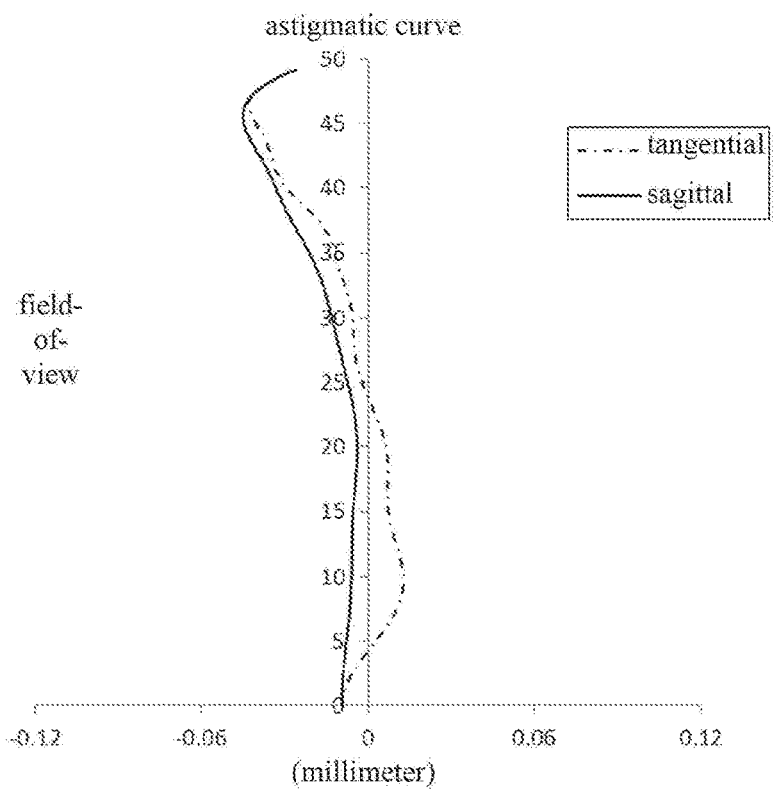
Figure 12C:
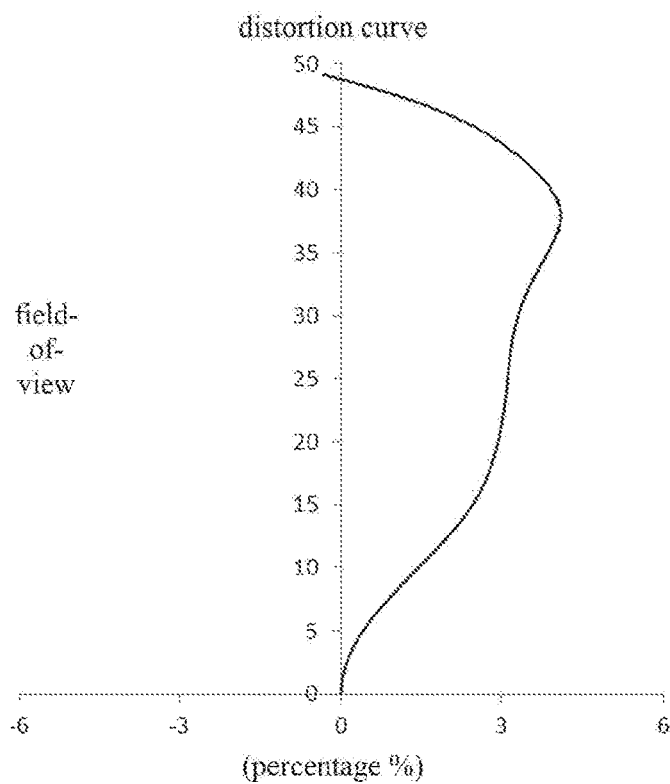
Figure 12D:
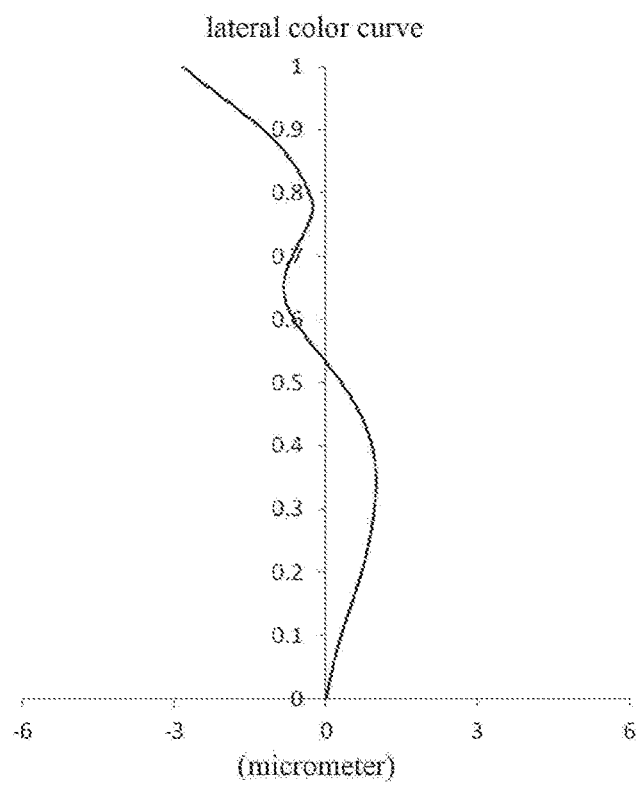

FIG. 12A illustrates the longitudinal aberration curve of the second lens system according to Embodiment 6, representing deviations of focal points converged by lights of different wavelengths after passing through the lens assembly. FIG. 12B illustrates the astigmatic curve of the second lens system according to Embodiment 6, representing a curvature of the tangential image plane and a curvature of the sagittal image plane. FIG. 12C illustrates the distortion curve of the second lens system according to Embodiment 6, representing amounts of distortion at different viewing angles. FIG. 12D illustrates the lateral color curve of the second lens system according to Embodiment 6, representing deviations of different image heights on the image plane after light passing through the lens assembly. In summary, with reference to FIGS. 12A to 12D, the second lens system according to Embodiment 6 can achieve good imaging quality.

Embodiment 7

Figure 13:
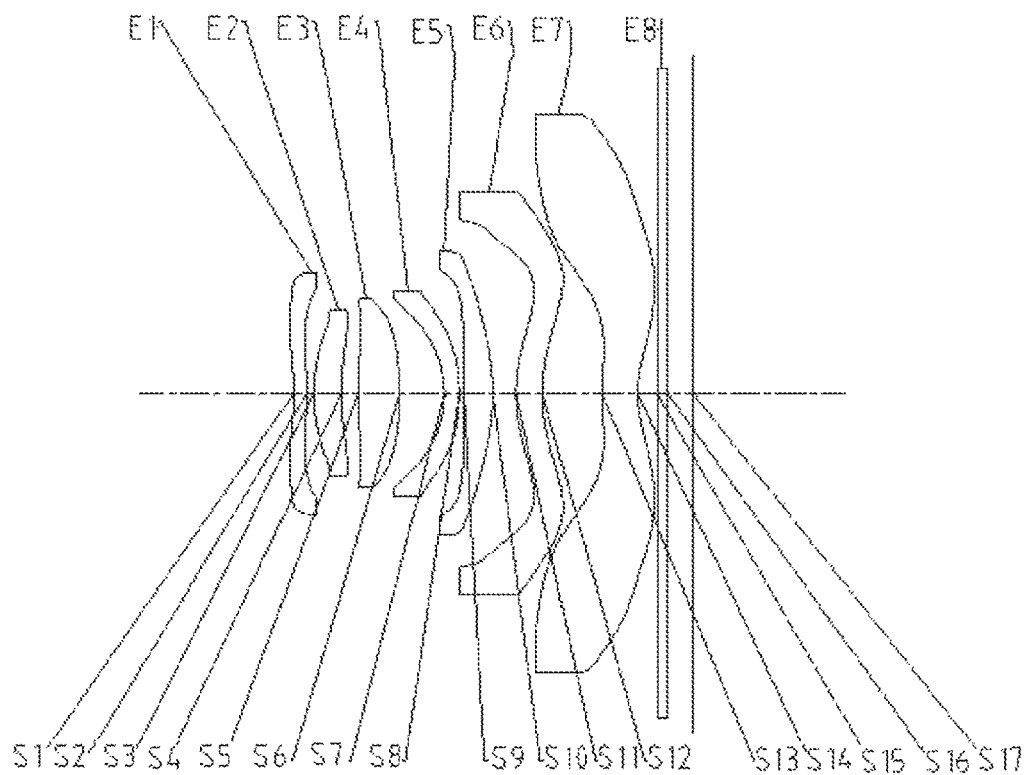
FIG. 13 is a schematic structural diagram illustrating a second lens system according to Embodiment 7.

A second lens system according to Embodiment 7 of the present disclosure is described with reference to FIGS. 13 to 14D. FIG. 13 is a schematic structural diagram illustrating the second lens system according to Embodiment 7.

As shown in FIG. 13, the second lens system includes, sequentially along the optical axis from the object side to the image side: a first lens E1, a second lens E2, a third lens E3, a fourth lens E4, a fifth lens E5, a sixth lens E6, a seventh lens E7, an optical filter E8, and an image plane S17.

The first lens E1 has a negative refractive power, the object-side surface S1 thereof is a concave surface and the image-side surface S2 thereof is a convex surface. The second lens E2 has a positive refractive power, the object-side surface S3 thereof is a convex surface and the image-side surface S4 thereof is a concave surface. The third lens E3 has a positive refractive power, the object-side surface S5 thereof is a convex surface and the image-side surface S6 thereof is a convex surface. The fourth lens E4 has a negative refractive power, the object-side surface S7 thereof is a concave surface and the image-side surface S8 thereof is a convex surface. The fifth lens E5 has a positive refractive power, the object-side surface S9 thereof is a concave surface and the image-side surface S10 thereof is a convex surface. The sixth lens E6 has a positive refractive power, the object-side surface S11 thereof is a convex surface and the image-side surface S12 thereof is a concave surface. The seventh lens E7 has a negative refractive power, the object-side surface S13 thereof is a convex surface and the image-side surface S14 thereof is a concave surface. The optical filter E8 has an object-side surface S15 and an image-side surface S16. Light from the object sequentially passes through the respective surfaces S1 to S16 and is finally form an image on image plane S17. In the present embodiment, the first lens E1 to the seventh lens E7 may be plastic lenses.

Although not shown, a diaphragm may be provided between the first lens E1 and the second lens E2 to further improve the imaging quality of the lens.

Table 13 below shows a basic parameter table of the second lens system of Embodiment 7, where the radius of curvature, the thickness and the focal length are all in millimeters (mm). Table 14 below shows the high-order coefficients applicable to the aspheric surfaces in Embodiment 7. The surface type of each aspheric surface may be defined by the formula (1) given in Embodiment 1.

TABLE 13

Embodiment 7: $f_W$ = 5.49 mm, $TTL_W$ = 7.84 mm, $ImgH_W$ = 6.63 mm, Semi-$FOV_W$ = 51.0°

| surface number | surface type | radius of curvature | thickness | Attribute refractive index | abbe number | Material | focal length | conic coefficient |
|---|---|---|---|---|---|---|---|---|
| OBJ | spherical | infinite | infinite | | | | | |
| S1 | aspheric | −5.3733 | 0.2540 | 1.67 | 20.4 | Plastic | −96.63 | −35.3088 |
| S2 | aspheric | −5.9733 | 0.4407 | | | | | −52.7030 |
| STO | spherical | infinite | −0.3064 | | | | | 0.0000 |
| S3 | aspheric | 3.1060 | 0.5440 | 1.55 | 56.1 | Plastic | 15.10 | −0.1103 |
| S4 | aspheric | 4.6759 | 0.3322 | | | | | −11.5688 |
| S5 | aspheric | 10.0300 | 0.8103 | 1.54 | 55.9 | Plastic | 7.40 | 12.6389 |
| S6 | aspheric | −6.3929 | 0.8845 | | | | | 4.4320 |
| S7 | aspheric | −2.1655 | 0.2911 | 1.68 | 19.2 | Plastic | −8.64 | 0.1177 |
| S8 | aspheric | −3.6239 | 0.0911 | | | | | 0.0708 |
| S9 | aspheric | −32.4752 | 0.5714 | 1.55, | 56.1 | Plastic | 7.87 | 2.4573 |
| S10 | aspheric | −3.8181 | 0.4568 | | | | | −0.2776 |
| S11 | aspheric | 3.2835 | 0.5102 | 1.67 | 20.4 | Plastic | 84.06 | −3.4625 |

TABLE 13-continued

Embodiment 7: $f_w$ = 5.49 mm, $TTL_w$ = 7.84 mm, $ImgH_w$ = 6.63 mm, Semi-$FOV_w$ = 51.0°

| surface number | surface type | radius of curvature | thickness | refractive index | abbe number | Material | focal length | conic coefficient |
|---|---|---|---|---|---|---|---|---|
| S12 | aspheric | 3.2712 | 1.1677 | | | | | −0.3894 |
| S13 | aspheric | 4.9155 | 0.7021 | 1.55 | 56.1 | Plastic | −7.61 | −0.3340 |
| S14 | aspheric | 2.1380 | 0.3804 | | | | | −1.0336 |
| S15 | spherical | infinite | 0.2100 | 1.52 | 64.2 | Glass | | |
| S16 | spherical | infinite | 0.5000 | | | | | |
| S17 | spherical | infinite | | | | | | |

TABLE 14

| Surface Number | A4 | A6 | A8 | A10 | A12 | A14 | A16 | A18 | A20 |
|---|---|---|---|---|---|---|---|---|---|
| S1 | −7.4000E−04 | 1.5996E−02 | −7.9600E−03 | 2.5550E−03 | −5.7000E−04 | 5.8100E−05 | 8.3000E−06 | −3.3000E−06 | 2.8862E−07 |
| S2 | −7.0300E−03 | 4.5576E−02 | −4.2640E−02 | 3.0271E−02 | −1.5050E−02 | 4.8270E−03 | −9.2000E−04 | 8.6400E−05 | −2.4771E−06 |
| S3 | −2.8440E−02 | 4.8268E−02 | −8.5320E−02 | 1.1628E−01 | −1.1082E−01 | 6.9200E−02 | −2.6800E−02 | 5.8090E−03 | −5.3768E−04 |
| S4 | −2.0320E−02 | 8.4450E−03 | −5.9700E−03 | 2.1830E−03 | 2.4500E−04 | −9.1000E−04 | 5.1800E−04 | −1.4000E−04 | 1.6648E−05 |
| S5 | −1.1660E−02 | 2.3500E−05 | −5.9800E−03 | 1.1885E−02 | −1.3190E−02 | 8.3910E−03 | −3.0500E−03 | 5.8300E−04 | −4.5008E−05 |
| S6 | −8.2200E−03 | 1.8800E−04 | −3.0000E−03 | 3.2340E−03 | −2.7900E−03 | 1.4570E−03 | −4.3000E−04 | 6.0300E−05 | −2.8115E−06 |
| S7 | −2.9910E−02 | 4.5740E−02 | −6.6030E−02 | 8.5586E−02 | −7.3050E−02 | 3.7844E−02 | −1.1520E−02 | 1.8990E−03 | −1.3029E−04 |
| S8 | −2.8780E−02 | −1.1300E−02 | 2.9251E−02 | −2.0120E−02 | 6.7880E−03 | −1.1600E−03 | 8.2378E−05 | 0.0000E+00 | 0.0000E+00 |
| S9 | 2.9704E−02 | −4.3430E−02 | 3.4133E−02 | −1.7050E−02 | 5.5160E−03 | −1.1800E−03 | 1.6100E−04 | −1.3000E−05 | 4.7391E−07 |
| S10 | 4.0280E−02 | −1.5170E−02 | −3.2300E−03 | 6.4370E−03 | −3.1700E−03 | 8.3200E−04 | −1.2000E−04 | 1.0000E−05 | −3.3602E−07 |
| S11 | 1.0910E−03 | −3.8000E−03 | 6.7900E−04 | −2.6000E−04 | 6.4700E−05 | −7.8000E−06 | 2.8300E−07 | 1.8500E−08 | −1.2625E−09 |
| S12 | −1.9040E−02 | 5.9160E−03 | −3.1900E−03 | 8.0600E−04 | −1.2000E−04 | 1.0600E−05 | −5.7000E−07 | 1.6500E−08 | −2.0115E−10 |
| S13 | −8.1880E−02 | 1.7451E−02 | −3.4100E−03 | 5.4600E−04 | −5.8000E−05 | 3.9000E−06 | −1.6000E−07 | 3.5100E−09 | −3.3333E−11 |
| S14 | −7.7480E−02 | 1.8038E−02 | −3.0600E−03 | 3.4000E−04 | −2.4000E−05 | 1.1100E−06 | −3.1000E−08 | 4.9500E−10 | −3.3842E−12 |

Figure 14A:
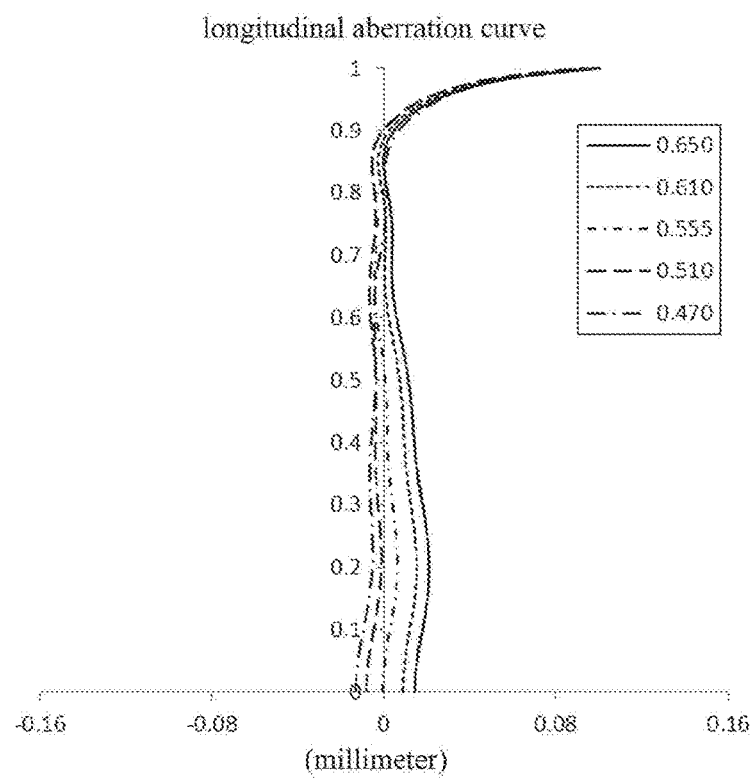
FIGS. 14A-14D respectively illustrate a longitudinal aberration curve, an astigmatic curve, a distortion curve and a lateral color curve of the second lens system according to Embodiment 7.
Figure 14B:
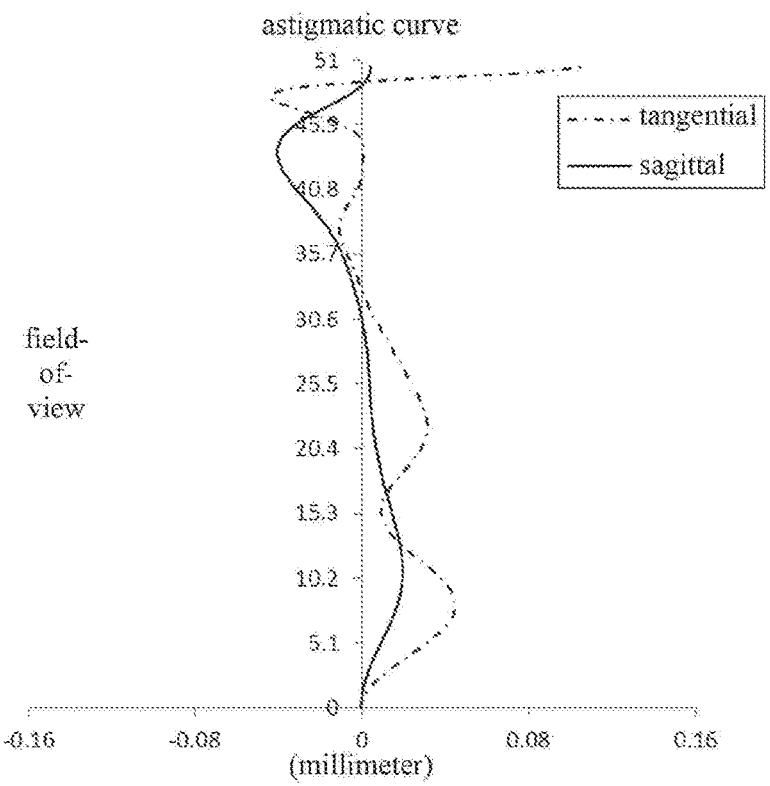
Figure 14C:
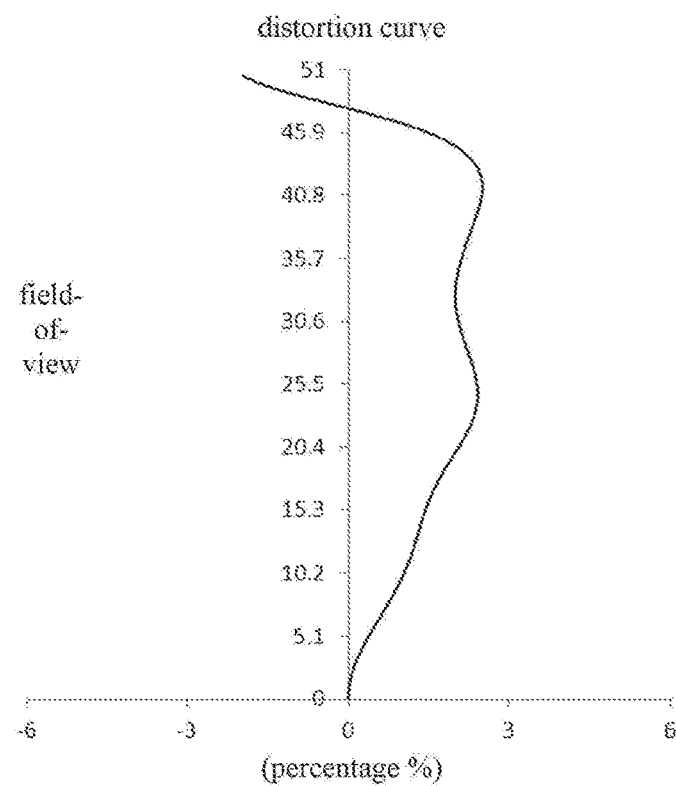
Figure 14D:
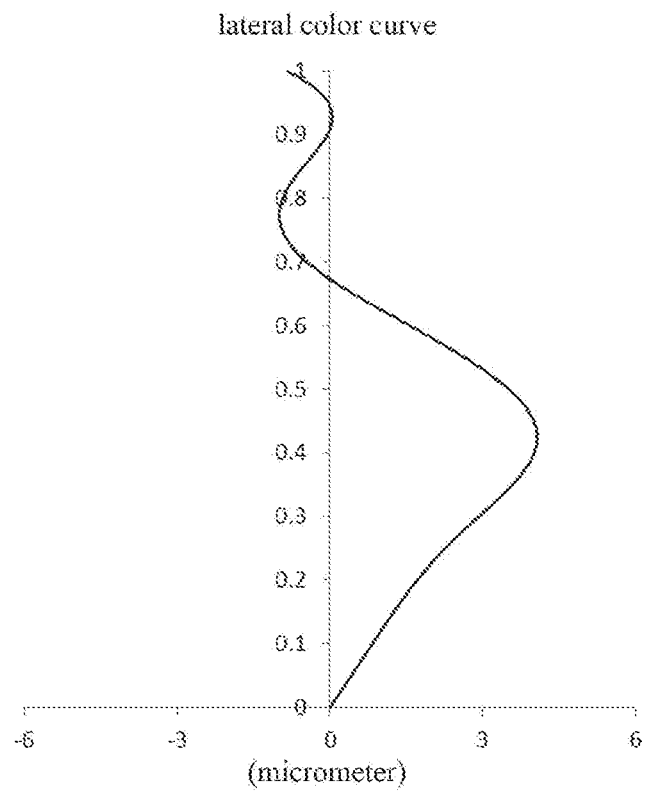

FIG. 14A illustrates the longitudinal aberration curve of the second lens system according to Embodiment 7, representing deviations of focal points converged by lights of different wavelengths after passing through the lens assembly. FIG. 14B illustrates the astigmatic curve of the second lens system according to Embodiment 7, representing a curvature of the tangential image plane and a curvature of the sagittal image plane. FIG. 14C illustrates the distortion curve of the second lens system according to Embodiment 7, representing amounts of distortion at different viewing angles. FIG. 14D illustrates the lateral color curve of the second lens system according to Embodiment 7, representing deviations of different image heights on the image plane after light passing through the lens assembly. In summary, with reference to FIGS. 14A to 14D, the second lens system according to Embodiment 7 can achieve good imaging quality.

Embodiment 8

Figure 15:
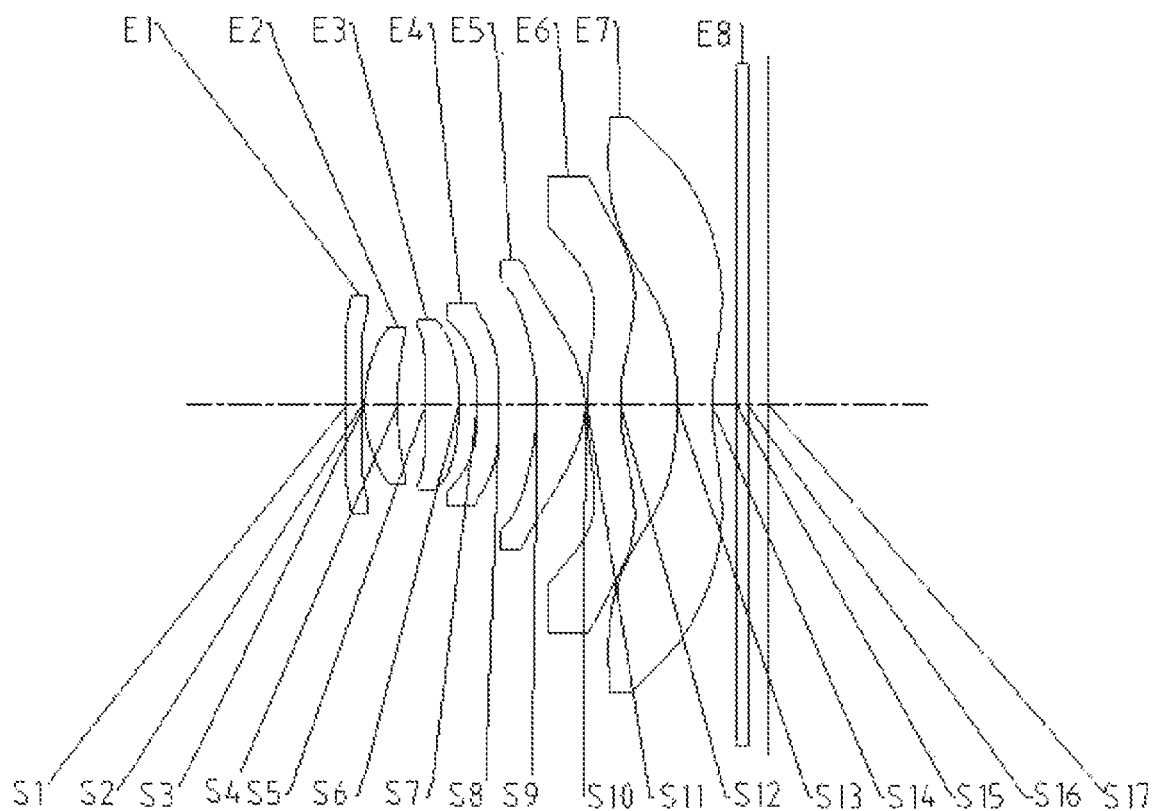
FIG. 15 is a schematic structural diagram illustrating a second lens system according to Embodiment 8.

A second lens system according to Embodiment 8 of the present disclosure is described with reference to FIGS. 15 to 16D. FIG. 15 is a schematic structural diagram illustrating the second lens system according to Embodiment 8.

As shown in FIG. 15, the second lens system includes, sequentially along the optical axis from the object side to the image side: a first lens E1, a second lens E2, a third lens E3, a fourth lens E4, a fifth lens E5, a sixth lens E6, a seventh lens E7, an optical filter E8, and an image plane S17.

The first lens E1 has a positive refractive power, the object-side surface S1 thereof is a concave surface and the image-side surface S2 thereof is a convex surface. The second lens E2 has a positive refractive power, the object-side surface S3 thereof is a convex surface and the image-side surface S4 thereof is a concave surface. The third lens E3 has a positive refractive power, the object-side surface S5 thereof is a concave surface and the image-side surface S6 thereof is a convex surface. The fourth lens E4 has a negative refractive power, the object-side surface S7 thereof is a concave surface and the image-side surface S8 thereof is a convex surface. The fifth lens E5 has a positive refractive power, the object-side surface S9 thereof is a concave surface and the image-side surface S10 thereof is a convex surface. The sixth lens E6 has a negative refractive power, the object-side surface S11 thereof is a convex surface and the image-side surface S12 thereof is a concave surface. The seventh lens E7 has a negative refractive power, the object-side surface S13 thereof is a concave surface and the image-side surface S14 thereof is a concave surface. The optical filter E8 has an object-side surface S15 and an image-side surface S16. Light from the object sequentially passes through the respective surfaces S1 to S16 and is finally form an image on image plane S17. In the present embodiment, the first lens E1 to the seventh lens E7 may be plastic lenses.

Although not shown, a diaphragm may be provided between the first lens E1 and the second lens E2 to further improve the imaging quality of the lens.

Table 15 below shows a basic parameter table of the second lens system of Embodiment 8, where the radius of curvature, the thickness and the focal length are all in millimeters (mm). Table 16 below shows the high-order coefficients applicable to the aspheric surfaces in Embodiment 8. The surface type of each aspheric surface may be defined by the formula (1) given in Embodiment 1.

TABLE 15

Embodiment 8: $f_W$ = 5.64 mm, $TTL_W$ = 7.90 mm, $ImgH_W$ = 6.54 mm, Semi-$FOV_W$ = 50.0°

| surface number | surface type | radius of curvature | thickness | refractive index | abbe number | Material | focal length | conic coefficient |
|---|---|---|---|---|---|---|---|---|
| OBJ | spherical | infinite | infinite | | | | | |
| S1 | aspheric | −14.9398 | 0.2897 | 1.65 | 23.5 | Plastic | 416.06 | 26.5440 |
| S2 | aspheric | −14.2590 | 0.4771 | | | | | 14.1208 |
| STO | spherical | infinite | −0.4344 | | | | | 0.0000 |
| S3 | aspheric | 2.7898 | 0.6198 | 1.55 | 56.1 | Plastic | 9.04 | 0.3111 |
| S4 | aspheric | 5.9142 | 0.5246 | | | | | 4.7299 |
| S5 | aspheric | −60.6335 | 0.6166 | 1.55 | 56.1 | Plastic | 15.42 | 98.5117 |
| S6 | aspheric | −7.4206 | 0.3532 | | | | | 14.6342 |
| S7 | aspheric | −6.6672 | 0.4172 | 1.68 | 19.2 | Plastic | −34.19 | −3.8312 |
| S8 | aspheric | −9.5981 | 0.7034 | | | | | 2.5772 |
| S9 | aspheric | −4.1844 | 0.8973 | 1.55 | 56.1 | Plastic | 5.19 | −3.8018 |
| S10 | aspheric | −1.8164 | 0.0353 | | | | | −1.4001 |
| S11 | aspheric | 5.8851 | 0.6273 | 1.68 | 19.2 | Plastic | −15.09 | 0.9382 |
| S12 | aspheric | 3.5741 | 1.0624 | | | | | −1.1404 |
| S13 | aspheric | −7.5624 | 0.6538 | 1.54 | 55.9 | Plastic | −4.77 | −8.4161 |
| S14 | aspheric | 3.9932 | 0.4590 | | | | | −0.9362 |
| S15 | spherical | infinite | 0.2100 | 1.52 | 64.2 | Glass | | |
| S16 | spherical | infinite | 0.3872 | | | | | |
| S17 | spherical | infinite | | | | | | |

TABLE 16

| Surface Number | A4 | A6 | A8 | A10 | A12 | A14 | A16 | A18 | A20 |
|---|---|---|---|---|---|---|---|---|---|
| S1 | 1.5748E−02 | −6.1008E−05 | −8.2000E−04 | 1.1930E−03 | −6.4107E−04 | 1.5700E−04 | −1.2000E−05 | −1.6000E−06 | 2.4800E−07 |
| S2 | 2.9984E−02 | −2.0529E−02 | 2.8985E−02 | −2.6880E−02 | 1.7261E−02 | −7.4400E−03 | 2.0340E−03 | −3.2000E−04 | 2.1300E−05 |
| S3 | 8.3716E−03 | −1.6103E−02 | 1.9049E−02 | −8.3300E−03 | −3.5685E−03 | 7.4650E−03 | −4.5500E−03 | 1.3390E−03 | −1.6000E−04 |
| S4 | −9.3521E−03 | −2.7242E−02 | 1.1174E−01 | −2.4132E−01 | 3.1575E−01 | −2.5273E−01 | 1.2102E−01 | −3.1760E−02 | 3.5000E−03 |
| S5 | −2.1481E−02 | 2.4789E−02 | −9.3620E−02 | 1.8865E−01 | −2.3299E−01 | 1.7920E−01 | −8.3790E−02 | 2.1796E−02 | −2.4300E−03 |
| S6 | −2.8713E−02 | −7.1822E−03 | 1.7838E−02 | −2.9640E−02 | 3.1411E−02 | −2.0430E−02 | 8.0310E−03 | −1.8000E−03 | 1.7600E−04 |
| S7 | −7.0263E−02 | 5.6532E−02 | −1.6170E−01 | 2.5228E−01 | −2.4099E−01 | 1.4505E−01 | −5.3320E−02 | 1.0858E−02 | −9.3000E−04 |
| S8 | −3.5424E−02 | 1.9045E−02 | −3.3970E−02 | 3.4784E−02 | −2.1727E−02 | 8.6570E−03 | −2.1500E−03 | 3.0100E−04 | −1.8000E−05 |
| S9 | −8.7899E−03 | 2.6278E−02 | −2.3570E−02 | 1.2364E−02 | −4.2760E−03 | 9.6900E−04 | −1.4000E−04 | 1.1000E−05 | −3.7000E−07 |
| S10 | 2.3354E−02 | −7.1662E−03 | 5.4900E−04 | 9.0100E−04 | −4.9083E−04 | 1.1500E−04 | −1.8000E−05 | 1.2800E−06 | −3.8000E−08 |
| S11 | 3.4333E−03 | −1.4162E−02 | 5.0660E−03 | −1.1300E−03 | 1.6797E−04 | −1.8000E−05 | 1.3900E−06 | −6.6000E−08 | 1.3600E−09 |
| S12 | −1.6563E−02 | −3.6001E−03 | 1.6340E−03 | −3.2000E−04 | 3.7188E−05 | −2.6000E−06 | 1.1400E−07 | −2.8000E−09 | 2.9100E−11 |
| S13 | −8.8237E−03 | −3.7085E−03 | 1.1750E−03 | −1.4000E−04 | 9.4877E−06 | −3.9000E−07 | 9.5700E−09 | −1.3000E−10 | 7.8100E−13 |
| S14 | −3.2948E−02 | 5.1491E−03 | −6.9000E−04 | 6.9200E−05 | −4.9128E−06 | 2.3400E−07 | −7.0000E−09 | 1.2100E−10 | −8.9000E−13 |

Figure 16A:
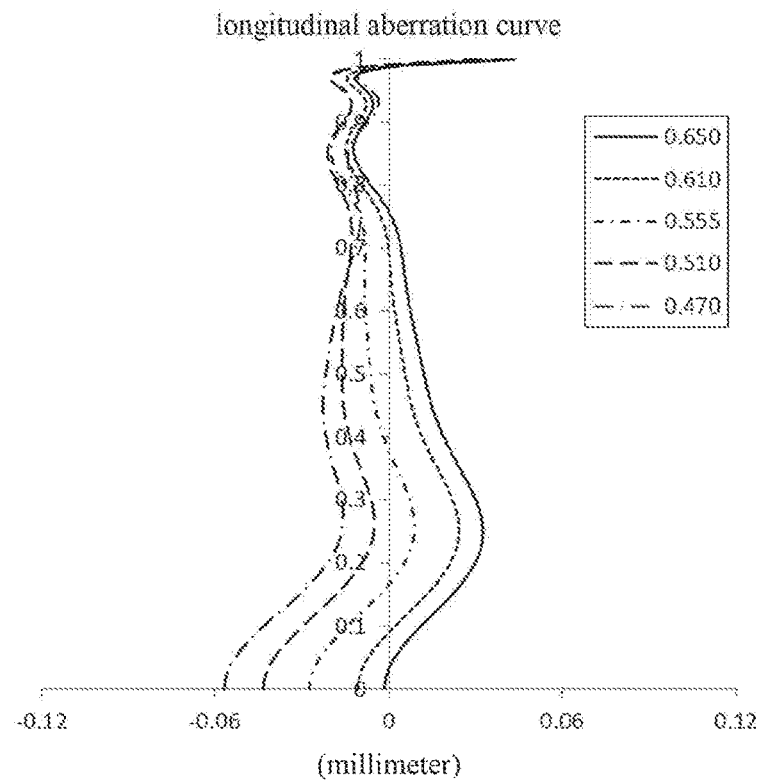
FIGS. 16A-16D respectively illustrate a longitudinal aberration curve, an astigmatic curve, a distortion curve and a lateral color curve of the second lens system according to Embodiment 8.
Figure 16B:
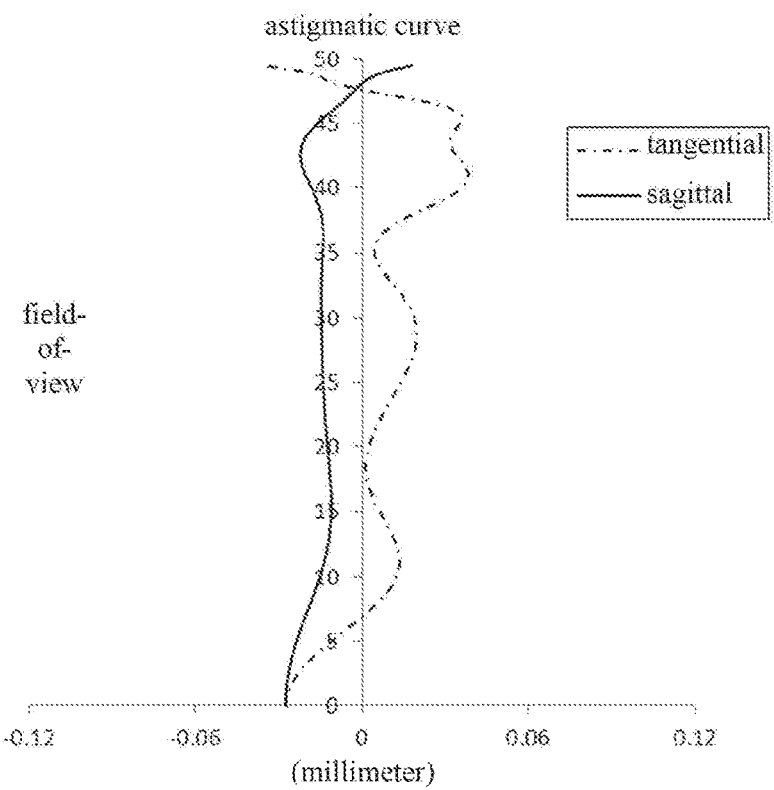
Figure 16C:
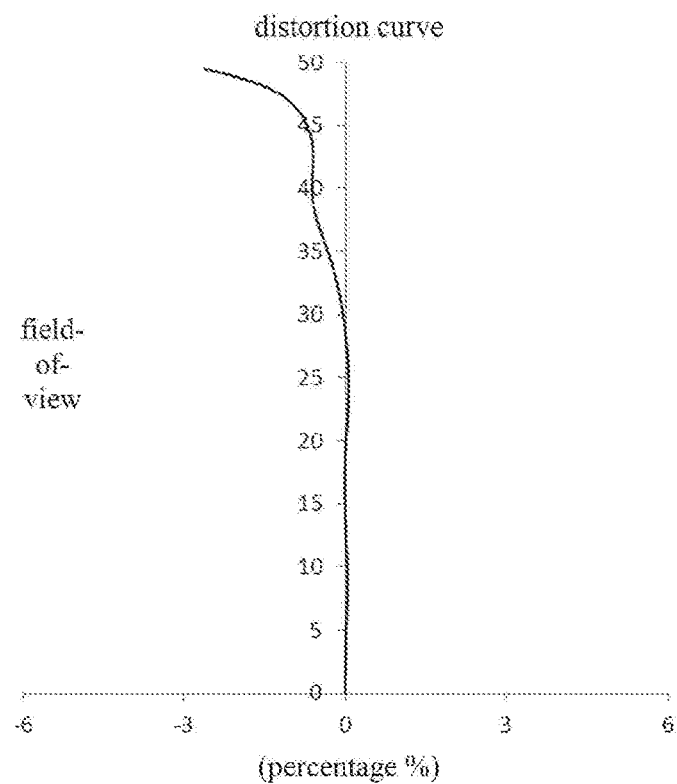
Figure 16D:
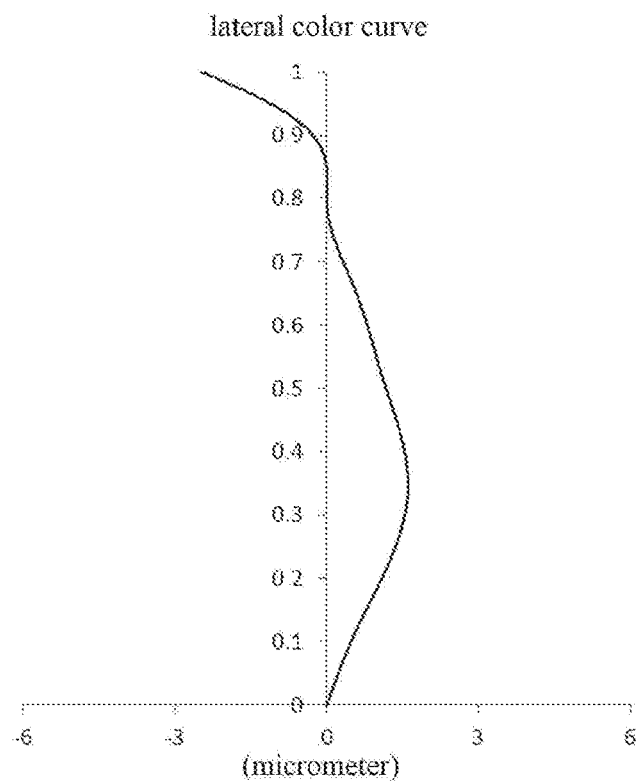

FIG. 16A illustrates the longitudinal aberration curve of the second lens system according to Embodiment 8, representing deviations of focal points converged by lights of different wavelengths after passing through the lens assembly. FIG. 16B illustrates the astigmatic curve of the second lens system according to Embodiment 8, representing a curvature of the tangential image plane and a curvature of the sagittal image plane. FIG. 16C illustrates the distortion curve of the second lens system according to Embodiment 8, representing amounts of distortion at different viewing angles. FIG. 16D illustrates the lateral color curve of the second lens system according to Embodiment 8, representing deviations of different image heights on the image plane after light passing through the lens assembly. In summary, with reference to FIGS. 16A to 16D, the second lens system according to Embodiment 8 can achieve good imaging quality.

To sum up, in Embodiments 1-8 described above, the conditional expressions satisfy the relationships shown in Table 17 below.

TABLE 17

| | Embodiment | | | | | | | |
|---|---|---|---|---|---|---|---|---|
| Conditional expression | 1 | 2 | 3 | 4 | 5 | 6 | 7 | 8 |
| Semi-$FOV_T$(°) | 37.1 | 37.1 | 37.5 | 36.7 | | | | |
| Semi-$FOV_W$(°) | | | | | 51.2 | 49.7 | 51.0 | 50.0 |
| $f_T$ (mm) | 5.36 | 5.39 | 5.35 | 5.23 | | | | |
| $f_W$ (mm) | | | | | 4.82 | 5.38 | 5.49 | 5.64 |
| $TTL_T/ImgH_T$ | 1.33 | 1.37 | 1.34 | 1.34 | | | | |
| $TTL_W/ImgH_W$ | | | | | 1.17 | 1.25 | 1.18 | 1.21 |

TABLE 17-continued

| Conditional expression | Embodiment | | | | | | | |
|---|---|---|---|---|---|---|---|---|
| | 1 | 2 | 3 | 4 | 5 | 6 | 7 | 8 |
| $f7_T/f_T$ | −0.88 | −0.76 | −0.80 | −0.72 | | | | |
| $f7_W/f_W$ | | | | | −1.28 | −1.38 | −1.39 | −0.85 |
| $(CT1_T + CT2_T)/TTL_T \times 5$ | 0.90 | 0.85 | 0.90 | 0.91 | | | | |
| $(CT1_W + CT2_W)/TTL_W \times 5$ | | | | | 0.49 | 0.42 | 0.50 | 0.58 |
| $f1_T/f2_T$ | −0.49 | −0.41 | −0.45 | −0.47 | | | | |
| $(R2_T - R1_T)/(R3_T - R4_T)$ | 1.29 | 0.78 | 0.99 | 1.29 | | | | |
| $(R11_T + R12_T)/(R9_T + R10_T)$ | 0.89 | 0.86 | 0.82 | 0.53 | | | | |
| $f_T/EPD_T$ | 2.06 | 2.10 | 2.06 | 2.05 | | | | |
| $f5_W/(f2_W + f3_W)$ | | | | | 0.31 | 0.19 | 0.35 | 0.21 |
| $(R7_W + R8_W)/f4_W$ | | | | | 0.89 | 0.77 | 0.67 | 0.48 |
| $(R3_W + R4_W)/(R11_W + R12_W)$ | | | | | 1.07 | 1.00 | 1.19 | 0.92 |

Although the first lens system and the second lens system both including seven lenses have been described above as an example, it will be appreciated by those skilled in the art that the number of lenses constituting the first lens system and/or the second lens system may be varied without departing from the claimed technical solution of the present disclosure. If desired, the first lens system and the second lens system may also include other numbers of lenses. Meanwhile, various embodiments of the first lens system and the second lens system mentioned above may be combined arbitrarily to obtain various results and advantages described in this specification without departing from the spirit and scope of the present disclosure.

Similarly, although the electronic imaging apparatus disclosed by the present disclosure includes two image-picking apparatuses, it should be understood that the number of image-picking apparatuses carried by the electronic imaging apparatus is merely an example and should not bring any limitation to the present disclosure. If desired, the electronic imaging device may also include other numbers of image-picking devices.

The foregoing is only a description for the preferred embodiments of the present disclosure and the applied technical principles. It should be appreciated by those skilled in the art that the inventive scope of the present disclosure is not limited to the technical solution formed by the particular combinations of the above technical feat Although both the first lens system and the second lens system have been described above in terms of including seven lenses, it will be appreciated by those skilled in the art that the number of lenses constituting the first lens system and/or the second lens system may be varied without departing from the claimed technical solution of the present disclosure. If desired, the first lens system and the second lens system may also include other numbers of lenses. Meanwhile, various embodiments of the first lens system and the second lens system mentioned above may be combined arbitrarily to obtain various results and advantages described in this specification without departing from the spirit and scope of the present disclosures. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. An electronic imaging apparatus, comprising:
a first image-picking apparatus, comprising a first lens system and a first electronic photosensitive element located on an image plane of the first lens system; and
a second image-picking apparatus, comprising a second lens system and a second electronic photosensitive element located on an image plane of the second lens system, and the second image-picking apparatus and the first image-picking apparatus are located on a same side of the electronic imaging apparatus,
wherein the first lens system sequentially comprises, along an optical axis of the first lens system from an object side to an image side: a first lens having a refractive power, a second lens, a third lens, a fourth lens, a fifth lens, a sixth lens, and a seventh lens, wherein the first lens of the first lens system has a positive refractive power, an object-side surface of the first lens of the first lens system is convex in a paraxial region and an image-side surface of the first lens of the first lens system is concave in a paraxial region, the second lens of the first lens system has a negative refractive power, an object-side surface of the second lens of the first lens system is convex in a paraxial region and an image-side surface of the second lens of the first lens system is concave in a paraxial region, an object-side surface of the fifth lens of the first lens system is concave in a paraxial region and an image-side surface of the fifth lens of the first lens system is convex in a paraxial region, an object-side surface of the sixth lens of the first lens system is concave in a paraxial region and an image-side surface of the sixth lens of the first lens system is convex in a paraxial region, the seventh lens of the first lens system has a negative refractive power, an object-side surface of the seventh lens of the first lens system is concave in a paraxial region and an image-side surface of the seventh lens of the first lens system is concave in a paraxial region;
wherein the second lens system sequentially comprises, along an optical axis of the second lens system from an object side to an image side: a first lens having a refractive power, a second lens, a third lens, a fourth lens, a fifth lens, a sixth lens, and a seventh lens, wherein an object-side surface of the first lens of the second lens system is concave in a paraxial region and an image-side surface of the first lens of the second lens system is convex in a paraxial region, the second lens of the second lens system has a positive refractive power, an object-side surface of the second lens of the second lens system is convex in a paraxial region and an image-side surface of the second lens of the second lens system is concave in a paraxial region, the third lens of the second lens system has a positive refractive power, an image-side surface of the third lens of the second lens system is convex in a paraxial region, the fourth lens of the second lens system has a negative refractive power, an object-side surface of the fourth lens of the second lens system is concave in a paraxial region and an image-side surface of the fourth lens of the second lens system is convex in a paraxial region, the fifth lens of the second lens system has a positive refractive power, an image-side surface of the fifth lens of the second lens system is convex in a paraxial region, an object-side surface of the sixth lens of the second lens system is convex in a paraxial region and an image-side surface of the sixth lens of the second lens system is concave in a paraxial region, the seventh lens of the second lens system has a negative refractive power, an image-side surface of the seventh lens of the second lens system is concave in a paraxial region;

half of a maximal field-of-view Semi-FOV$_T$ of the first lens system satisfies: $35°<\text{Semi-FOV}_T<55°$; and half of a maximal field-of-view Semi-FOV$_W$ of the second lens system satisfies: $35°<\text{Semi-FOV}_W<55°$; and wherein, a total effective focal length $f_T$ of the first lens system satisfies: $4.7 \text{ mm}<f_T<5.7 \text{ mm}$;

a total effective focal length $f_W$ of the second lens system satisfies: $4.7 \text{ mm}<f_W<5.7 \text{ mm}$;

the total effective focal length $f_T$ of the first lens system and an effective focal length $f7_T$ of the seventh lens of the first lens system satisfy: $-1.4<f7_T/f_T<-0.7$; and the total effective focal length $f_W$ of the second lens system and an effective focal length $f7_W$ of the seventh lens of the second lens system satisfy: $-1.4<f7_W/f_W<-0.7$.

2. The electronic imaging apparatus according to claim 1, wherein, a distance TTL$_T$ on the optical axis of the first lens system from an object-side surface of the first lens of the first lens system to the image plane of the first lens system, and half of a diagonal length ImgH$_T$ of an effective pixel area on the image plane of the first lens system satisfy: TTL$_T$/ImgH$_T$<1.4; and a distance TTL$_W$ on the optical axis of the second lens system from the object-side surface of the first lens of the second lens system to the image plane of the second lens system, and half of a diagonal length ImgH$_W$ of an effective pixel area on the image plane of the second lens system satisfy: TTL$_W$/ImgH$_W$<1.4.

3. The electronic imaging apparatus according to claim 1, wherein, the distance TTL$_T$ on the optical axis of the first lens system from an object-side surface of the first lens of the first lens system to the image plane of the first lens system, a center thickness CT1$_T$ of the first lens of the first lens system on the optical axis of the first lens system, and a center thickness CT2$_T$ of the second lens of the first lens system on the optical axis of the first lens system satisfy: $0.4<(CT1_T+CT2_T)/TTL_T \times 5<1.0$; and the distance TTL$_W$ on the optical axis of the second lens system from an object-side surface of the first lens of the first lens system to the image plane of the second lens system, a center thickness CT1$_W$ of the first lens of the second lens system on the optical axis of the second lens system, and a center thickness CT2$_W$ of the second lens of the second lens system on the optical axis of the second lens system satisfy: $0.4<(CT1_W+CT2_W)/TTL_W \times 5<1.0$.

4. The electronic imaging apparatus according to claim 1, wherein an effective focal length $f1_T$ of the first lens of the first lens system and an effective focal length $f2_T$ of the second lens of the first lens system satisfy: $-0.6<f1_T/f2_T<-0.2$.

5. The electronic imaging apparatus according to claim 1, wherein a radius of curvature R2$_T$ of an image-side surface of the first lens of the first lens system, a radius of curvature R1$_T$ of an object-side surface of the first lens of the first lens system, a radius of curvature R3$_T$ of an object-side surface of the second lens of the first lens system, and a radius of curvature R4$_T$ of an image-side surface of the second lens of the first lens system satisfy: $0.7<(R2_T-R1_T)/(R3_T-R4_T)<1.3$.

6. The electronic imaging apparatus according to claim 1, wherein a radius of curvature R11$_T$ of an object-side surface of the sixth lens of the first lens system, a radius of curvature R12$_T$ of an image-side surface of the sixth lens of the first lens system, a radius of curvature R9$_T$ of an object-side surface of the fifth lens of the first lens system, and a radius of curvature R10$_T$ of an image-side surface of the fifth lens of the first lens system satisfy: $0.5<(R11_T+R12_T)/(R9_T+R10_T)<0.9$.

7. The electronic imaging apparatus according to claim 1, wherein a total effective focal length $f_T$ of the first lens system and an entrance pupil diameter EPD$_T$ of the first lens system satisfy: $f_T/EPD_T \leq 2.10$.

8. The electronic imaging apparatus according to claim 1, wherein an effective focal length $f5_W$ of the fifth lens of the second lens system, an effective focal length $f2_W$ of the second lens of the second lens system, and an effective focal length $f3_W$ of the third lens of the second lens system satisfy: $0.1<f5_W/(f2_W+f3_W)<0.5$.

9. The electronic imaging apparatus according to claim 1, wherein a radius of curvature R7$_W$ of an object-side surface of the fourth lens of the second lens system, a radius of curvature R8$_W$ of an image-side surface of the fourth lens of the second lens system, and an effective focal length $f4_W$ of the fourth lens of the second lens system satisfy: $0.4<(R7_W+R8_W)/f4_W<0.9$.

10. The electronic imaging apparatus according to claim 1, wherein a radius of curvature R3$_W$ of an object-side surface of the second lens of the second lens system, a radius of curvature R4$_W$ of an image-side surface of the second lens of the second lens system, a radius of curvature R11$_W$ of an object-side surface of the sixth lens of the second lens system, and a radius of curvature R12$_W$ of an image-side surface of the sixth lens of the second lens system satisfy: $0.8<(R3_W+R4_W)/(R11_W+R12_W)<1.3$.

11. The electronic imaging apparatus according to claim 1, wherein the seventh lens of the first lens system has a negative refractive power, an object-side surface thereof is a concave surface and an image-side surface thereof is a concave surface.

12. The electronic imaging apparatus according to claim 1, wherein an image-side surface of the third lens of the second lens system is a convex surface; and the seventh lens of the second lens system has a negative refractive power, an image-side surface thereof is a concave surface.

13. The electronic imaging apparatus according to claim 1, wherein in the first lens system, there is an air spacing between any two adjacent lenses on an optical axis of the first lens system; and in the second lens system, there is an air spacing between any two adjacent lenses on the optical axis of the second lens system.

14. The electronic imaging apparatus according to claim 1, wherein at least five lenses in the first to the seventh lens of the first lens system are plastic lenses; and at least five lenses in the first to the seventh lens of the second lens system are plastic lenses.

15. The electronic imaging apparatus according to claim 1, wherein the first image-picking apparatus and the second image-picking apparatus are arranged longitudinally or laterally on one side of the electronic imaging apparatus.

16. An electronic imaging apparatus, comprising:

a first image-picking apparatus, comprising a first lens system and a first electronic photosensitive element located on an image plane of the first lens system; and a second image-picking apparatus, comprising a second lens system and a second electronic photosensitive element located on an image plane of the second lens system, and the second image-picking apparatus and the first image-picking apparatus are located on a same side of the electronic imaging apparatus, wherein the first lens system sequentially comprises, along an optical axis of the first lens system from an object side to an image side: a first lens having a refractive power, a second lens, a third lens, a fourth lens, a fifth lens, a sixth lens, and a seventh lens, wherein the first lens of the first lens system has a positive refractive power, an object-side surface of the first lens of the first lens system is convex in a paraxial region and an image-side surface of the first lens of the first lens system is concave in a paraxial region, the second lens of the first lens system has a negative refractive power, an object-side surface of the second lens of the first lens system is convex in a paraxial region and an image-side surface of the second lens of the first lens system is concave in a paraxial region, an object-side surface of the fifth lens of the first lens system is concave in a paraxial region and an image-side surface of the fifth lens of the first lens system is convex in a paraxial region, an object-side surface of the sixth lens of the first lens system is concave in a paraxial region and an image-side surface of the sixth lens of the first lens system is convex in a paraxial region, the seventh lens of the first lens system has a negative refractive power, an object-side surface of the seventh lens of the first lens system is concave in a paraxial region and an image-side surface of the seventh lens of the first lens system is concave in a paraxial region;

wherein the second lens system sequentially comprises, along an optical axis of the second lens system from an object side to an image side: a first lens having a refractive power, a second lens, a third lens, a fourth lens, a fifth lens, a sixth lens, and a seventh lens, wherein an object-side surface of the first lens of the second lens system is concave in a paraxial region and an image-side surface of the first lens of the second lens system is convex in a paraxial region, the second lens of the second lens system has a positive refractive power, an object-side surface of the second lens of the second lens system is convex in a paraxial region and an image-side surface of the second lens of the second lens system is concave in a paraxial region, the third lens of the second lens system has a positive refractive power, an image-side surface of the third lens of the second lens system is convex in a paraxial region, the fourth lens of the second lens system has a negative refractive power, an object-side surface of the fourth lens of the second lens system is concave in a paraxial region and an image-side surface of the fourth lens of the second lens system is convex in a paraxial region, the fifth lens of the second lens system has a positive refractive power, an image-side surface of the fifth lens of the second lens system is convex in a paraxial region, an object-side surface of the sixth lens of the second lens system is convex in a paraxial region and an image-side surface of the sixth lens of the second lens system is concave in a paraxial region, the seventh lens of the second lens system has a negative refractive power, an image-side surface of the seventh lens of the second lens system is concave in a paraxial region;

a total effective focal length $f_T$ of the first lens system satisfies: 4.7 mm<$f_T$<5.7 mm;

a total effective focal length $f_W$ of the second lens system satisfies: 4.7 mm<$f_W$<5.7 mm;

the total effective focal length $f_T$ of the first lens system and an effective focal length $f7_T$ of the seventh lens of the first lens system satisfy: $-1.4<f7_T/f_T<-0.7$; and the total effective focal length $f_W$ of the second lens system and an effective focal length $f7_W$ of the seventh lens of the second lens system satisfy: $-1.4<f7_W/f_W<-0.7$.

17. The electronic imaging apparatus according to claim 16, wherein the distance $TTL_T$ on the optical axis of the first lens system from an object-side surface of the first lens of the first lens system to an image plane of the first lens system and half of a diagonal length $ImgH_T$ of an effective pixel area on the image plane of the first lens system satisfy: $TTL_T/ImgH_T<1.4$; and a distance $TTL_W$ on the optical axis of the second lens system from the object-side surface of the first lens of the second lens system to the image plane of the second lens system, and half of a diagonal length $ImgH_W$ of an effective pixel area on the image plane of the second lens system satisfy: $TTL_W/ImgH_W<1.4$.

* * * * *